(12) United States Patent
Watanabe et al.

(10) Patent No.: US 11,607,803 B2
(45) Date of Patent: Mar. 21, 2023

(54) IMAGE INFORMATION PROCESSING DEVICE, GRIPPING SYSTEM, AND IMAGE INFORMATION PROCESSING METHOD

(71) Applicant: THK CO., LTD., Tokyo (JP)

(72) Inventors: Toshiya Watanabe, Tokyo (JP); Yoshikazu Matsuo, Tokyo (JP); Shinji Kawabata, Kawasaki (JP); Yoshimasa Endo, Tokyo (JP); Kenji Hidaka, Tokyo (JP); Daisuke Kawabata, Kawasaki (JP)

(73) Assignee: THK CO., LTD., Tokyo (JP)

( * ) Notice: Subject to any disclaimer, the term of this patent is extended or adjusted under 35 U.S.C. 154(b) by 132 days.

(21) Appl. No.: 17/295,681

(22) PCT Filed: Oct. 4, 2019

(86) PCT No.: PCT/JP2019/039298
§ 371 (c)(1),
(2) Date: May 20, 2021

(87) PCT Pub. No.: WO2020/105295
PCT Pub. Date: May 28, 2020

(65) Prior Publication Data
US 2022/0009092 A1 Jan. 13, 2022

(30) Foreign Application Priority Data

Nov. 21, 2018 (JP) .............................. JP2018-218556

(51) Int. Cl.
B25J 9/16 (2006.01)
B25J 13/08 (2006.01)
(Continued)

(52) U.S. Cl.
CPC ............. *B25J 9/1612* (2013.01); *B25J 13/08* (2013.01); *G06V 20/10* (2022.01); *B25J 15/08* (2013.01)

(58) Field of Classification Search
CPC . B25J 9/1612; B25J 13/08; B25J 15/08; B25J 9/1697; G06V 20/10;
(Continued)

(56) References Cited

U.S. PATENT DOCUMENTS 4,957,320 A * 9/1990 Ulrich .................. B25J 15/0009
294/111
7,168,748 B2 * 1/2007 Townsend ............ C25D 11/005
901/46
(Continued)

FOREIGN PATENT DOCUMENTS

CN 206395485 U * 8/2017
DE 102015104732 A1 10/2015
(Continued)

OTHER PUBLICATIONS

International Search Report dated Dec. 10, 2019, issued in counterpart application No. PCT/JP2019/039298 (4 pages).
(Continued)

*Primary Examiner* — Jaime Figueroa
(74) *Attorney, Agent, or Firm* — WHDA, LLP

(57) ABSTRACT

An object of the present invention is to ascertain parts of an object that are approachable by finger portions of a hand mechanism. In an image information processing device, a housing container is retrieved from an image by using a first retrieval frame, and an object is retrieved from the image by using a second retrieval frame. A plurality of determination points are set in advance on the second retrieval frame, and a predetermined approach direction is set for each determination point. A determination is then made as to whether or (Continued)

not the finger portions of the hand mechanism can be caused to approach parts of one object, existing within the second retrieval frame, that correspond respectively to the determination points set on the second retrieval frame from the predetermined approach directions set in relation to the determination points.

13 Claims, 24 Drawing Sheets

(51) Int. Cl.
  *B25J 15/08* (2006.01)
  *G06V 20/10* (2022.01)
(58) Field of Classification Search
  CPC .... G05B 19/41815; G06T 2207/30164; G06T 7/75; Y02P 90/02
  USPC ................. 700/245–264; 318/568.11–568.25
  See application file for complete search history.

(56) References Cited

U.S. PATENT DOCUMENTS

| | | | |
|---|---|---|---|
| 7,654,595 B2 * | 2/2010 | Yokoyama | B25J 9/142 294/99.1 |
| 8,231,158 B2 * | 7/2012 | Dollar | B25J 15/12 294/111 |
| 8,549,952 B2 * | 10/2013 | Matsukuma | B25J 9/104 901/31 |
| 8,936,289 B1 * | 1/2015 | Kozlowski | B25J 19/0091 901/45 |
| 8,936,290 B1 * | 1/2015 | Salisbury | B25J 15/0009 294/111 |
| 9,102,053 B2 | 8/2015 | Suzuki | |
| 9,486,921 B1 * | 11/2016 | Straszheim | B25J 9/1697 |
| 9,649,767 B2 * | 5/2017 | Nusser | B25J 9/1697 |
| 9,764,467 B2 | 9/2017 | Harada et al. | |
| 9,802,317 B1 * | 10/2017 | Watts | G05B 19/402 |
| 11,298,818 B2 * | 4/2022 | Kawabata | B25J 15/0009 |
| 11,370,130 B2 * | 6/2022 | Endo | B25J 9/102 |
| 11,389,951 B2 * | 7/2022 | Kawabata | B25J 15/0009 |
| 2005/0151092 A1 * | 7/2005 | Kitagawa | G01N 35/1011 250/442.11 |
| 2005/0218679 A1 * | 10/2005 | Yokoyama | B25J 9/142 294/99.1 |
| 2009/0302626 A1 * | 12/2009 | Dollar | B25J 15/12 294/106 |
| 2013/0238125 A1 | 9/2013 | Suzuki | |
| 2015/0276383 A1 | 10/2015 | Yoshikawa et al. | |
| 2017/0021502 A1 * | 1/2017 | Nusser | B25J 9/1687 |
| 2018/0056523 A1 | 3/2018 | Aiso et al. | |
| 2018/0257225 A1 | 9/2018 | Satou | |
| 2020/0114508 A1 * | 4/2020 | Kawabata | B25J 15/10 |
| 2020/0171652 A1 * | 6/2020 | Kawabata | B25J 19/02 |
| 2020/0171677 A1 * | 6/2020 | Endo | B25J 15/10 |
| 2020/0269445 A1 * | 8/2020 | Endo | B25J 15/0009 |
| 2021/0114216 A1 * | 4/2021 | Matsuo | B25J 15/0009 |

FOREIGN PATENT DOCUMENTS

| | | |
|---|---|---|
| DE | 102018001781 A1 | 9/2018 |
| JP | H11-333770 A | 12/1999 |
| JP | 2013-184278 A | 9/2013 |
| JP | 5429614 B2 | 2/2014 |
| JP | 2014-161965 A | 9/2014 |
| JP | 2015-042965 A | 3/2015 |
| JP | 2016-108057 A | 6/2016 |
| JP | 2016-221647 A | 12/2016 |

OTHER PUBLICATIONS

Decision to grant a patent dated Jun. 14, 2022, issued in counterpart JP application No. JP2018-218556 (5 pages).
Office Action dated Dec. 22, 2022, issued in counterpart DE application No. 112019005825.8, with English translation. (12 pages).

* cited by examiner

[Fig. 1]
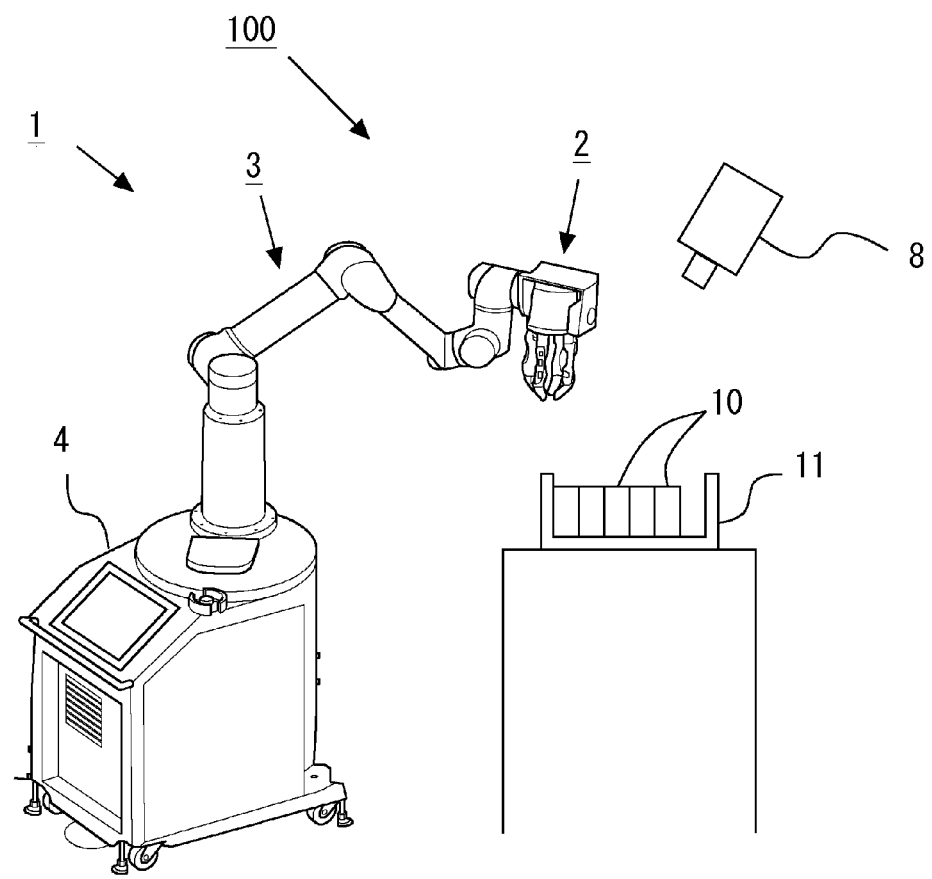

[Fig. 2]
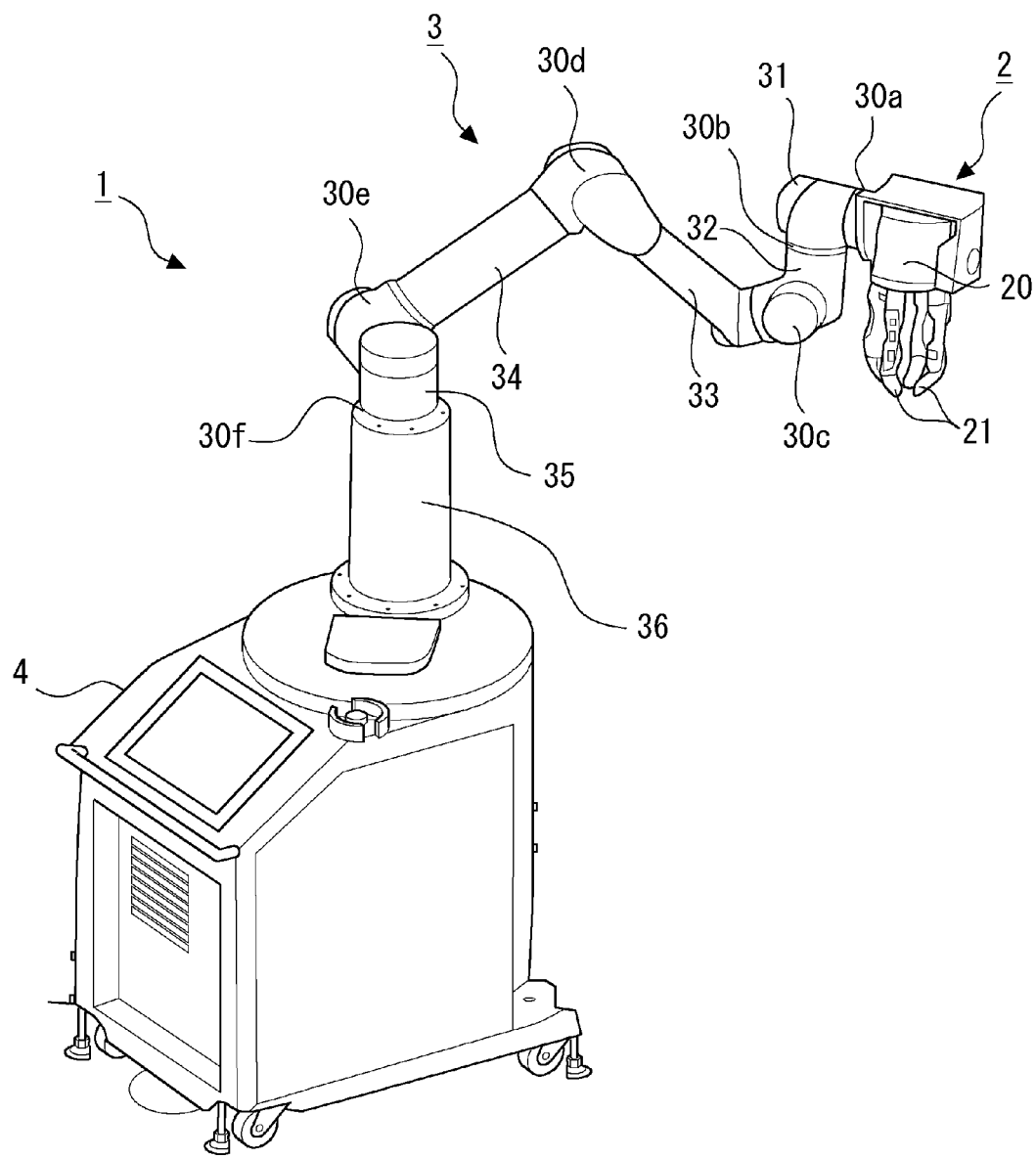

[Fig. 3]
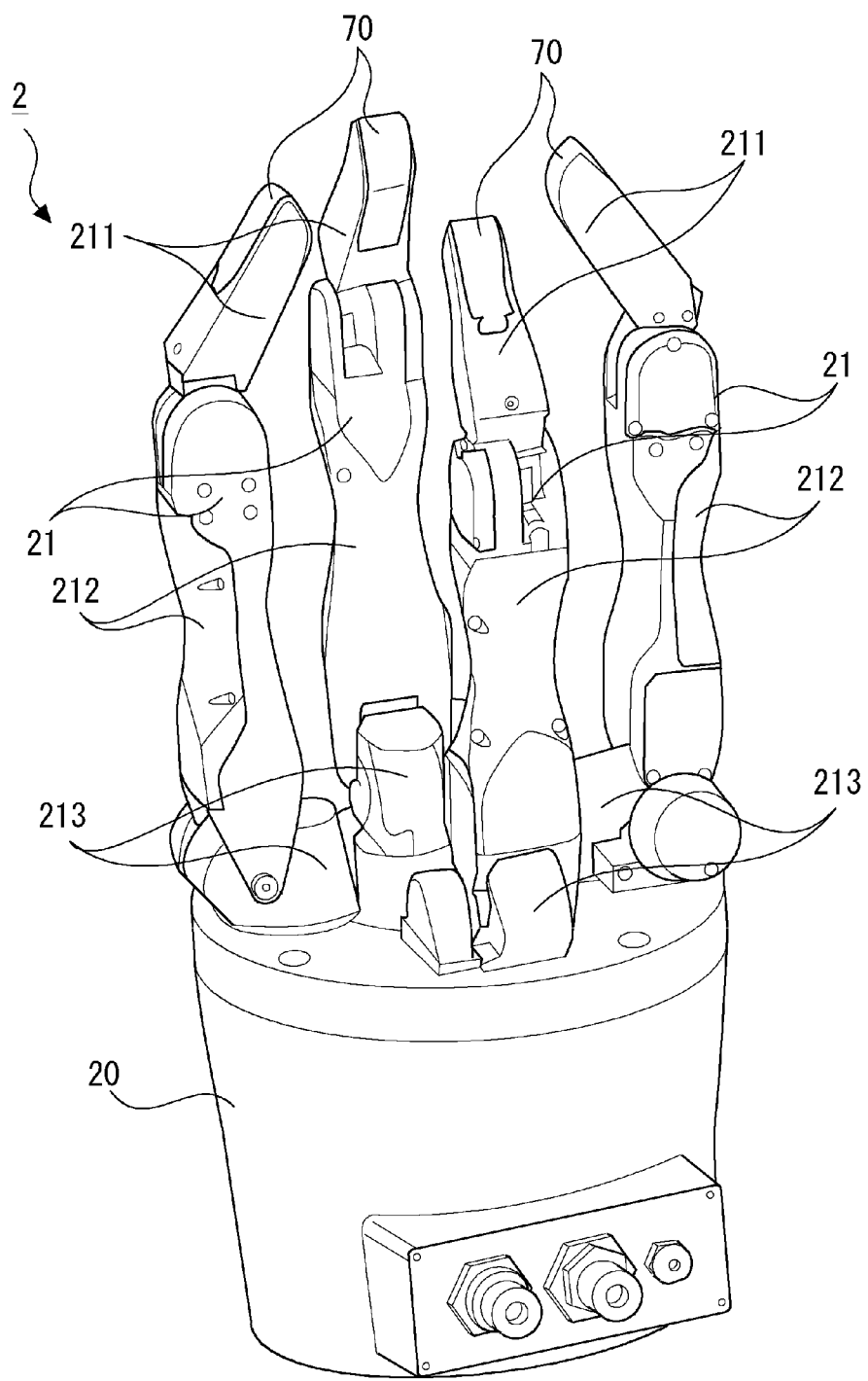

[Fig. 4]
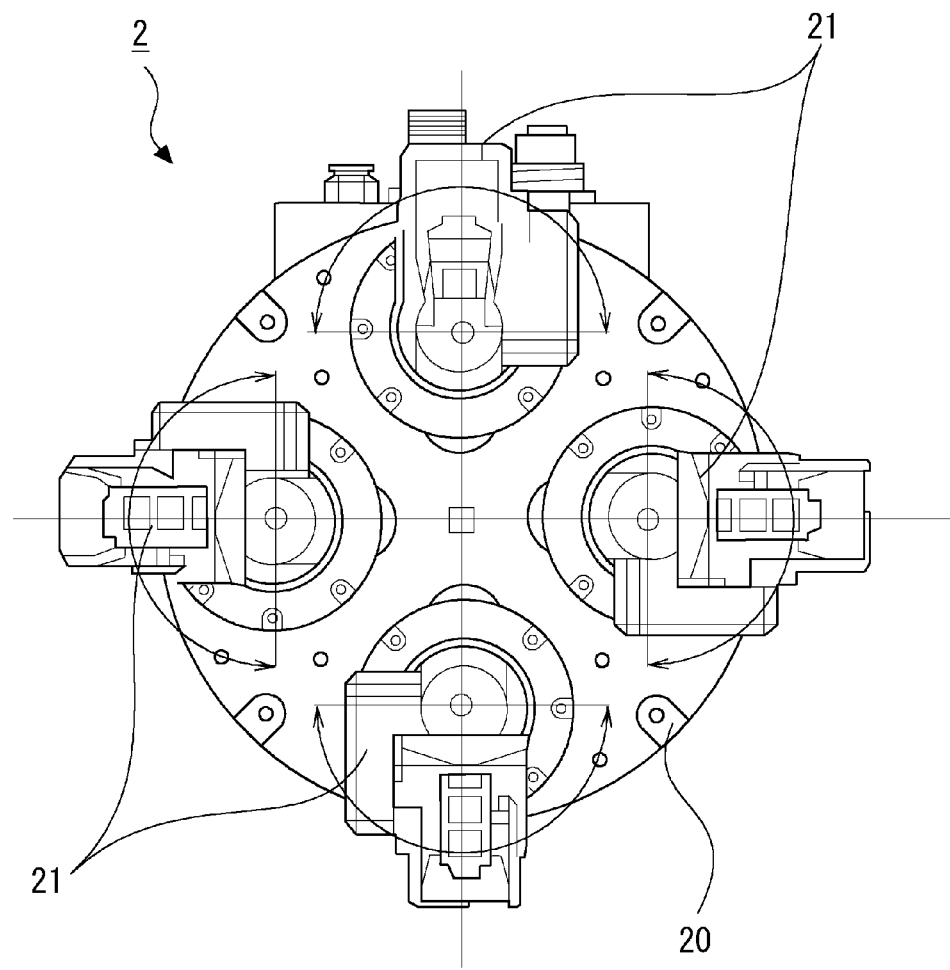

[Fig. 5]
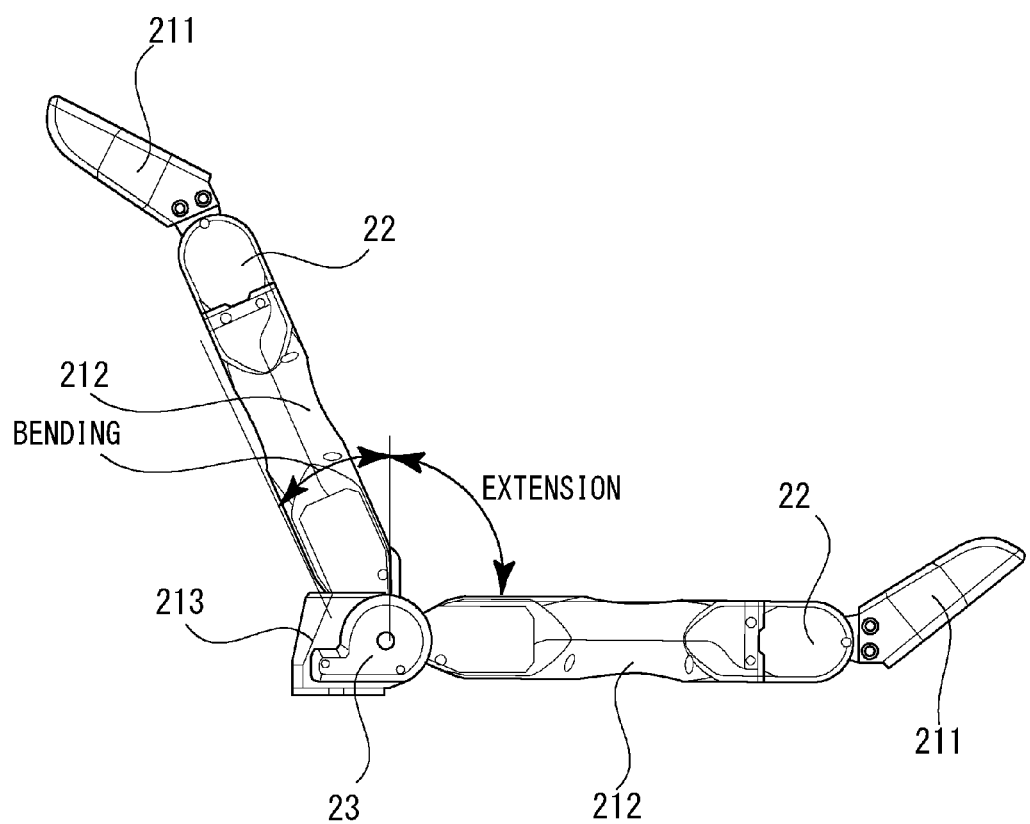

[Fig. 6]
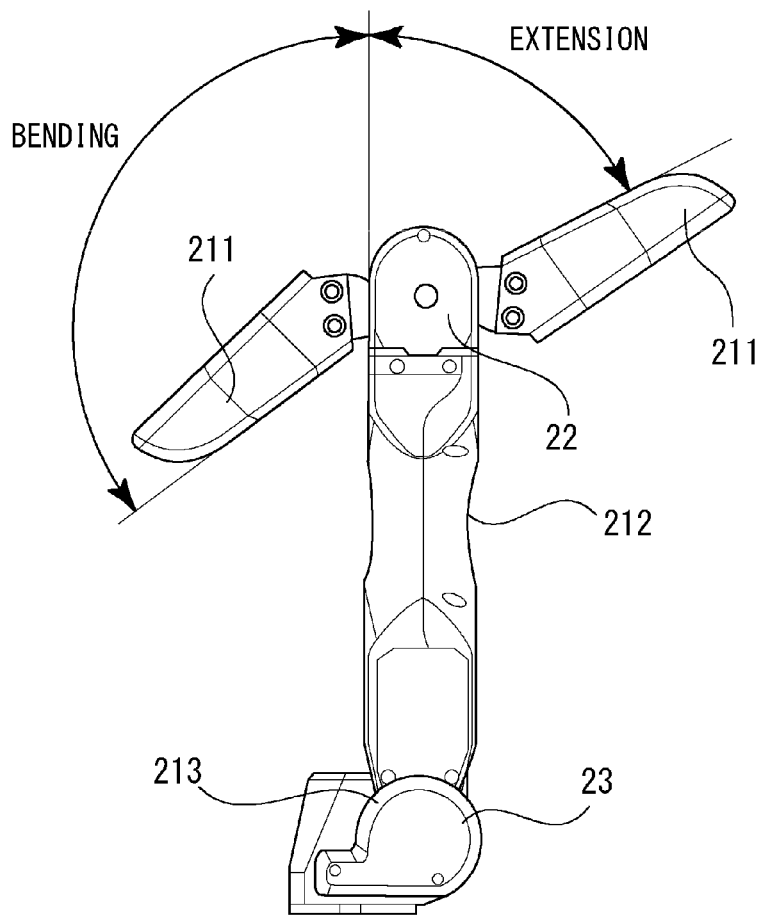

[Fig. 7]
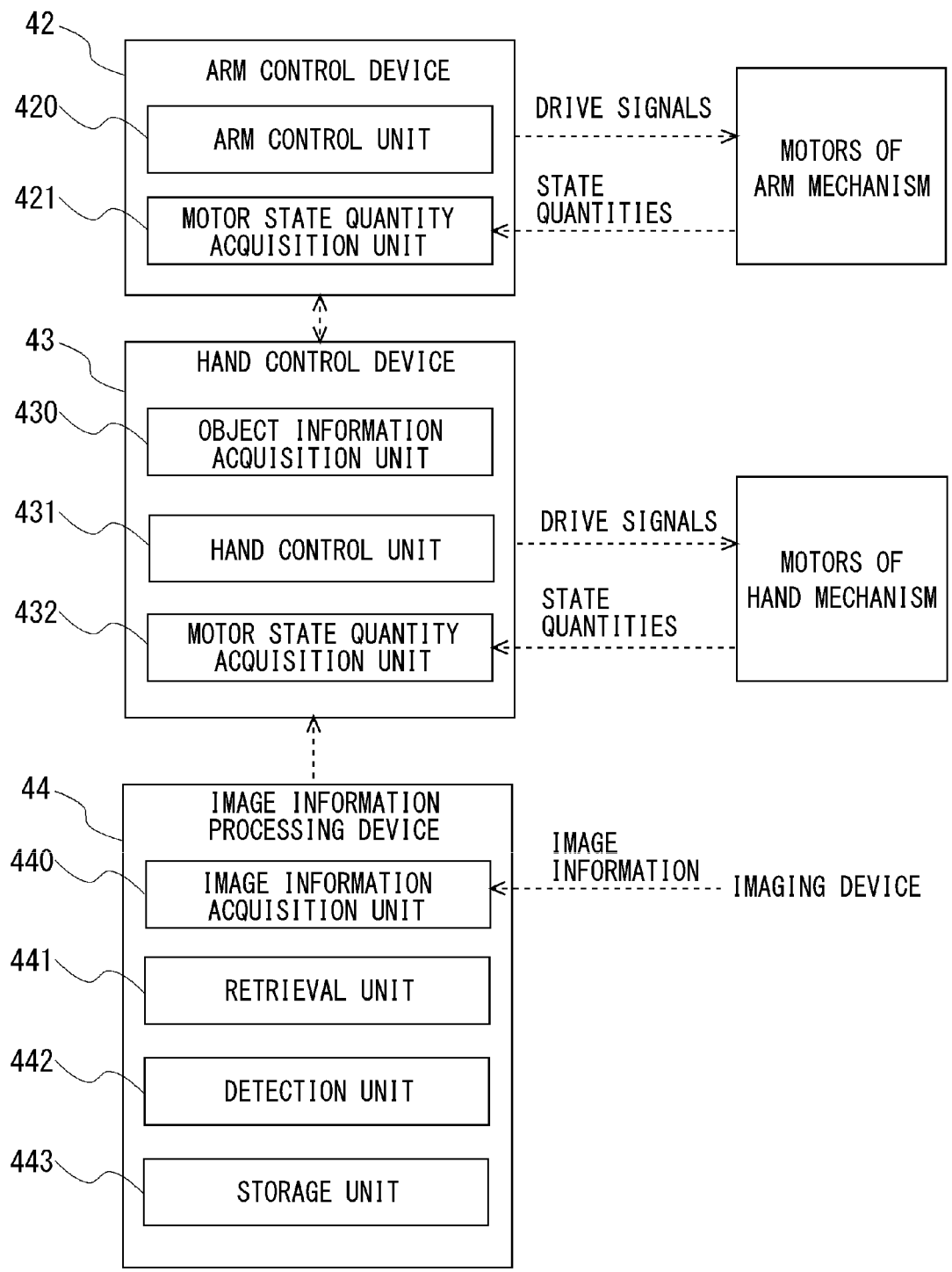

[Fig. 8]
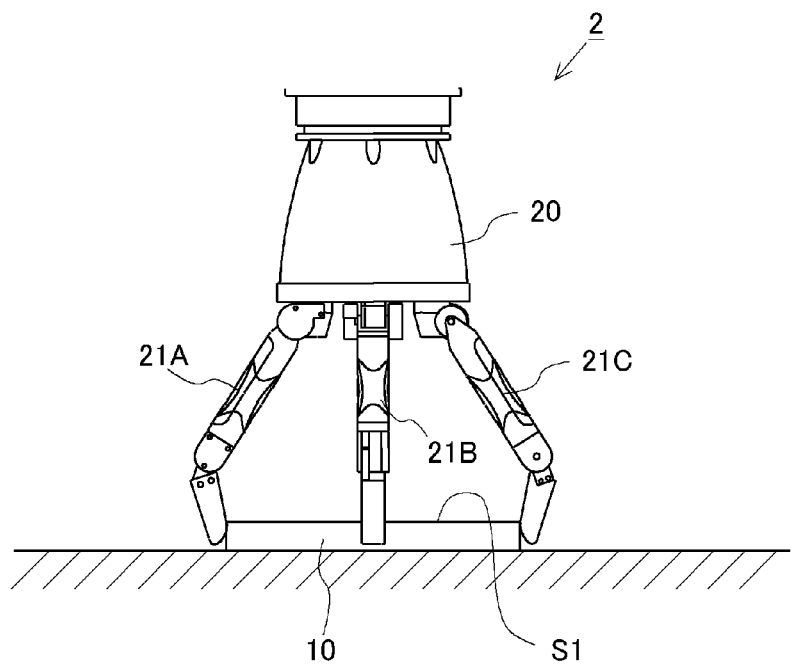

[Fig. 9]
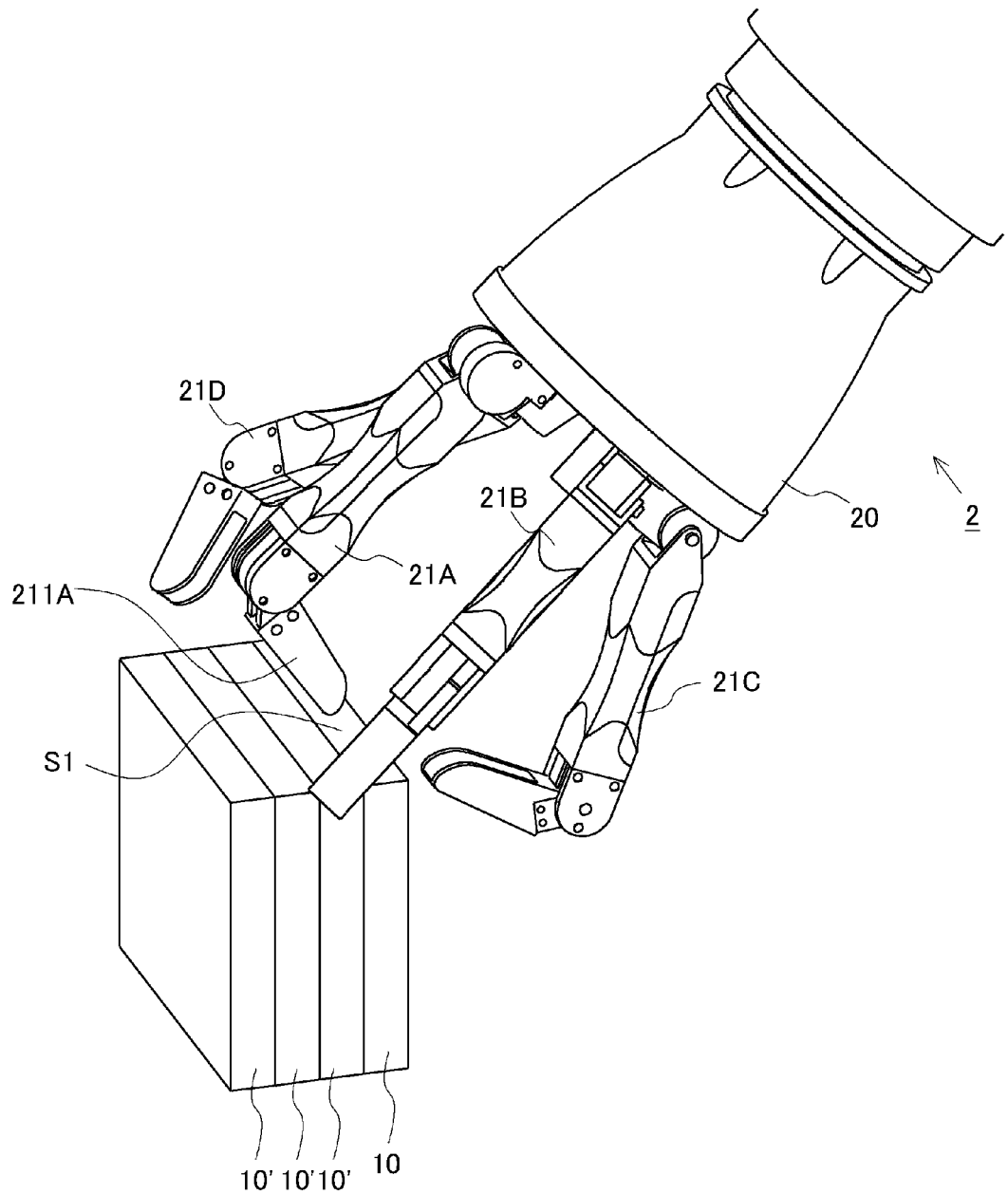

[Fig. 10]
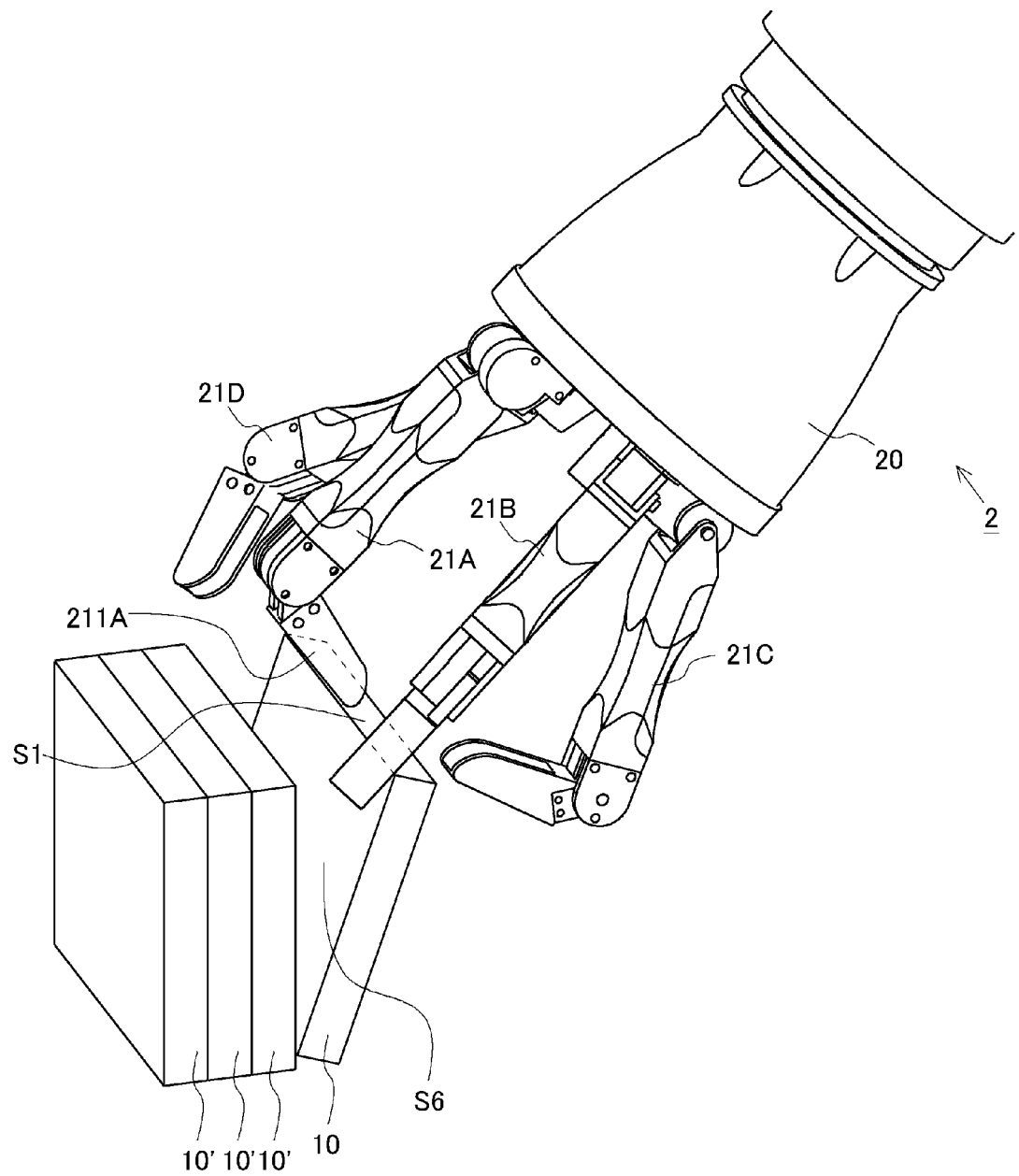

[Fig. 11]
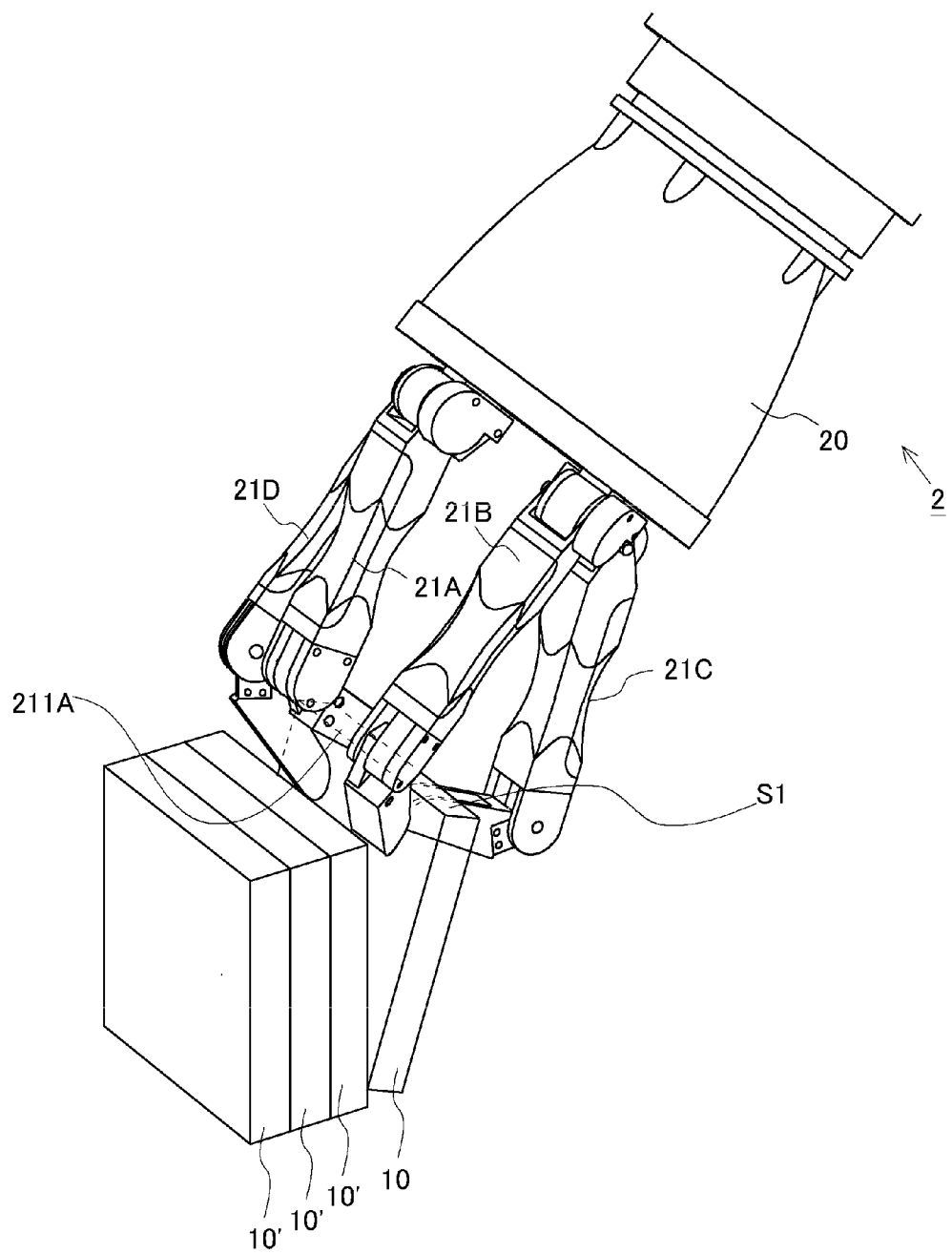

[Fig. 12]
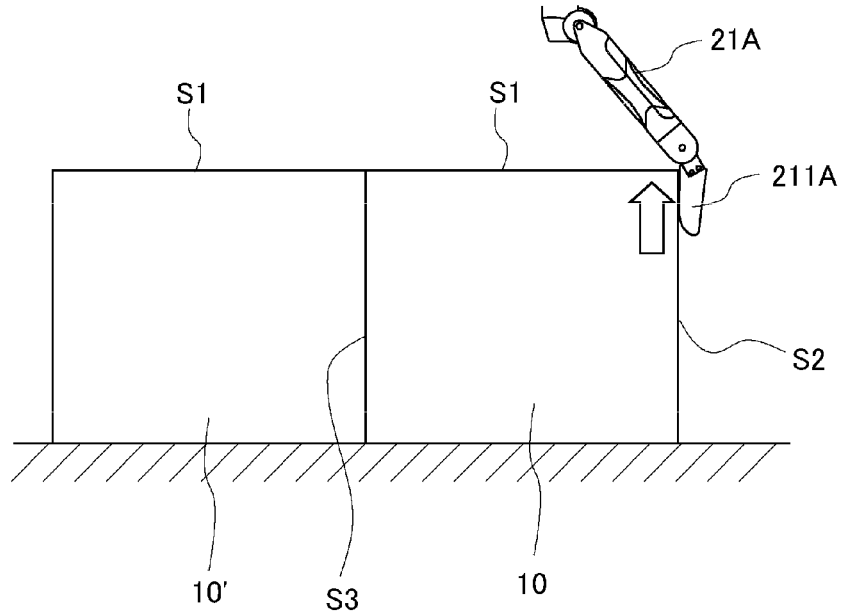
[Fig. 13]
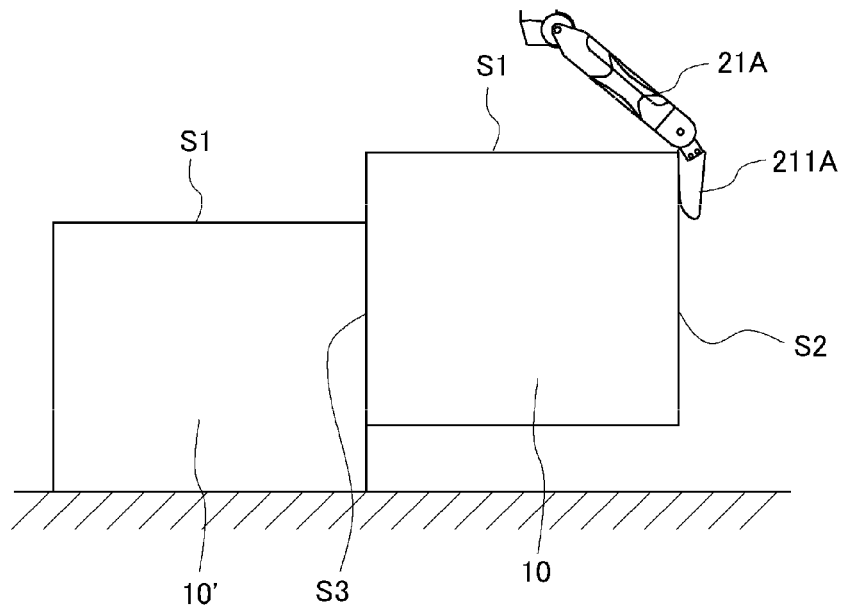

[Fig. 14]
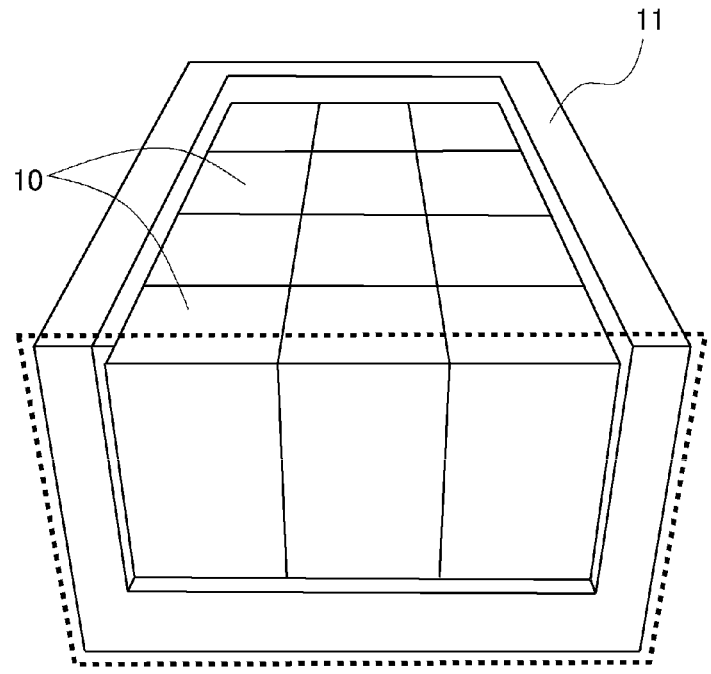
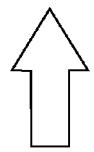
[Fig. 15]
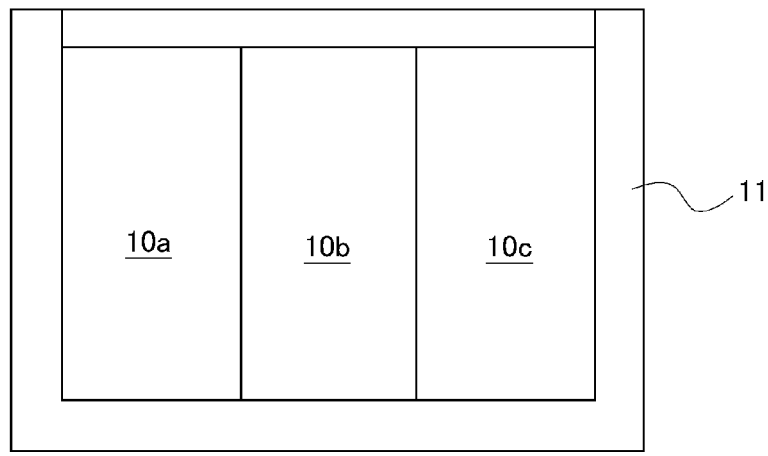

[Fig. 16]
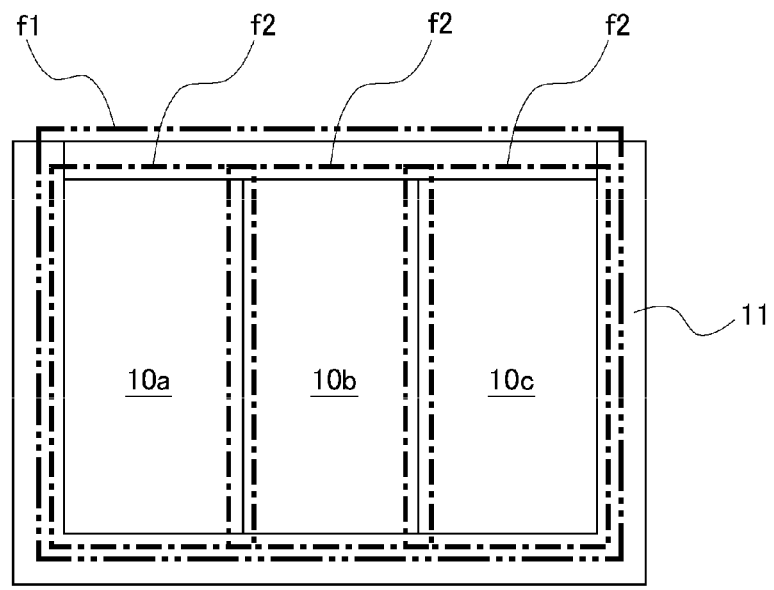
[Fig. 17]
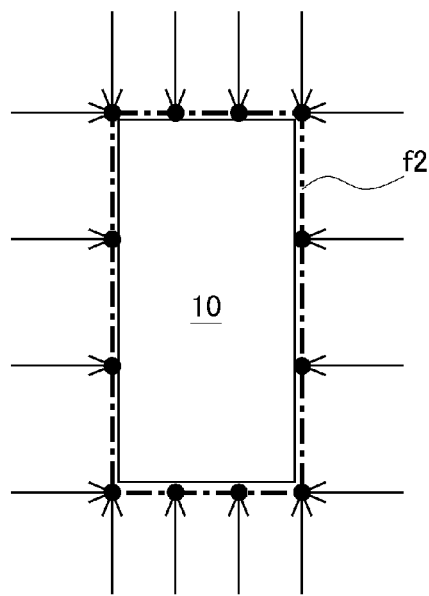

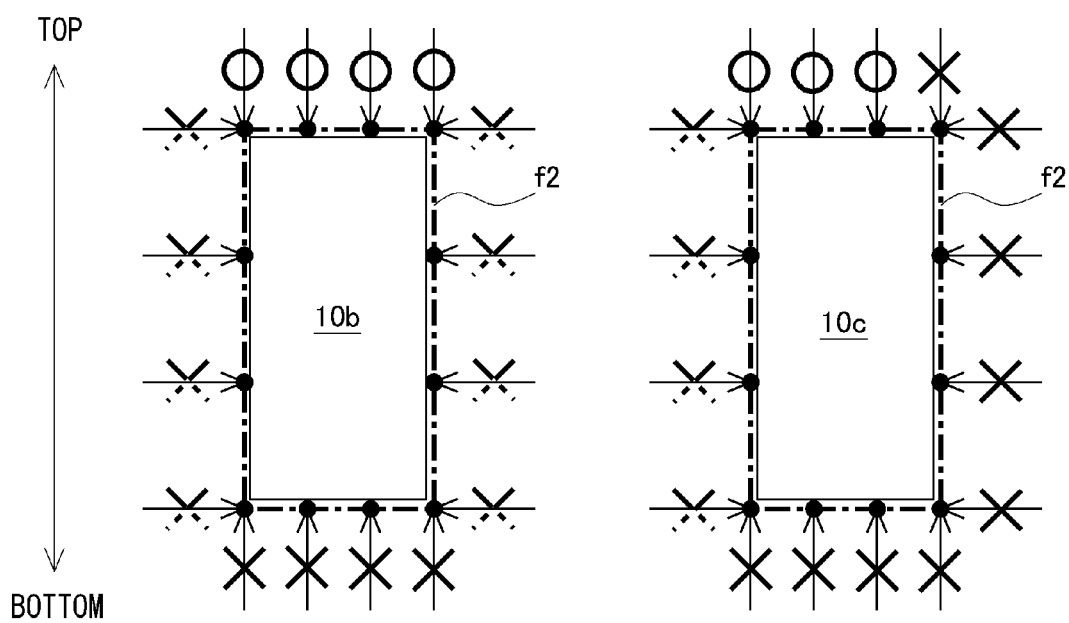
[Fig. 18]

[Fig. 19]
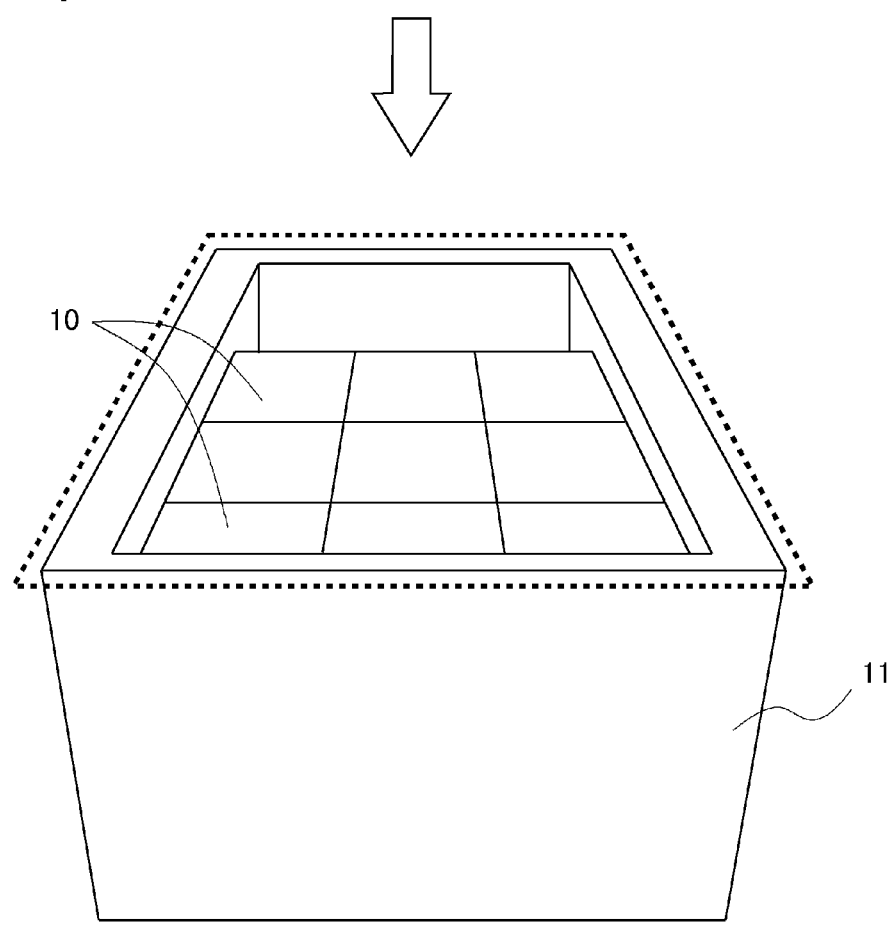

[Fig. 20]
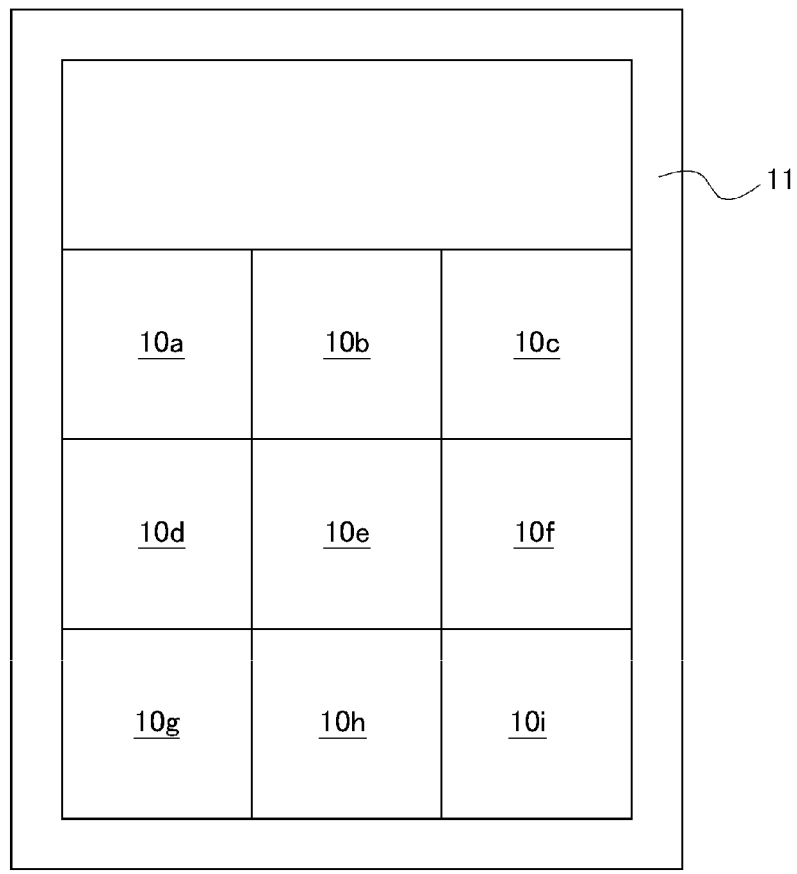

[Fig. 21]
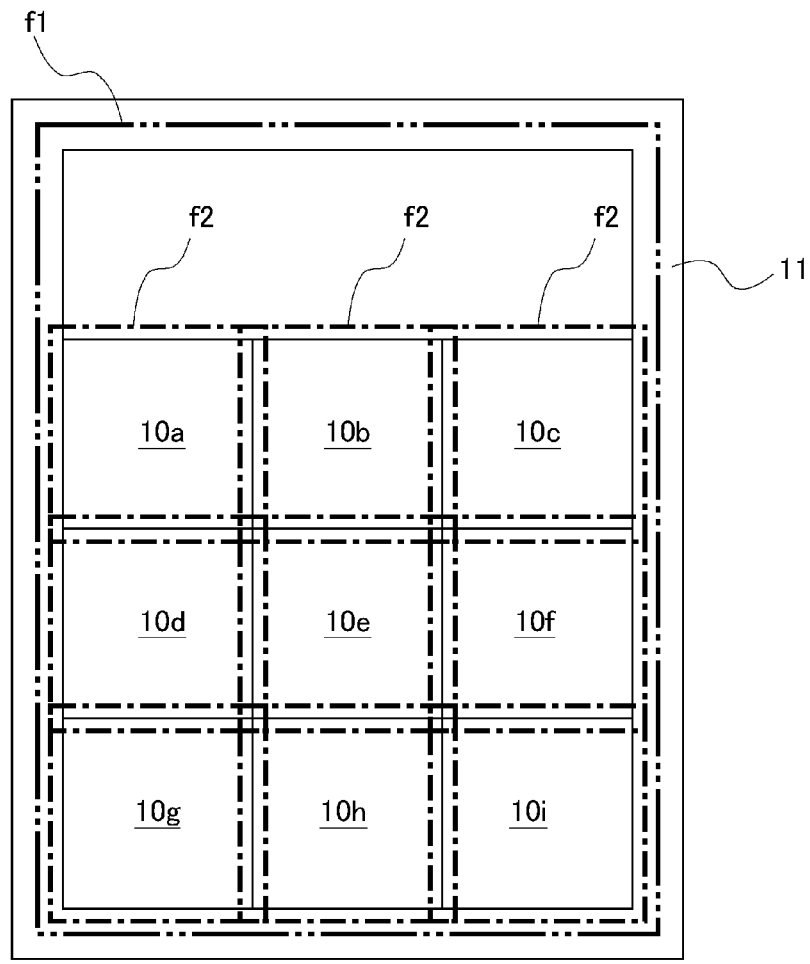
[Fig. 22]
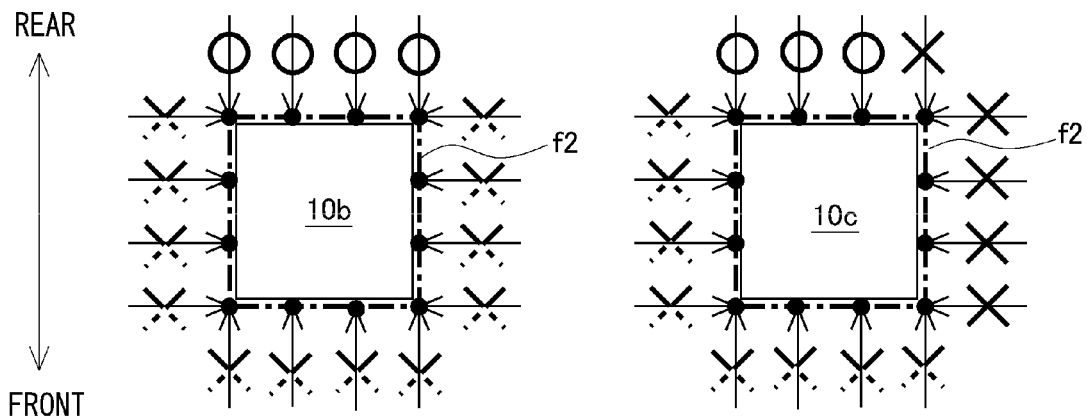

[Fig. 23]
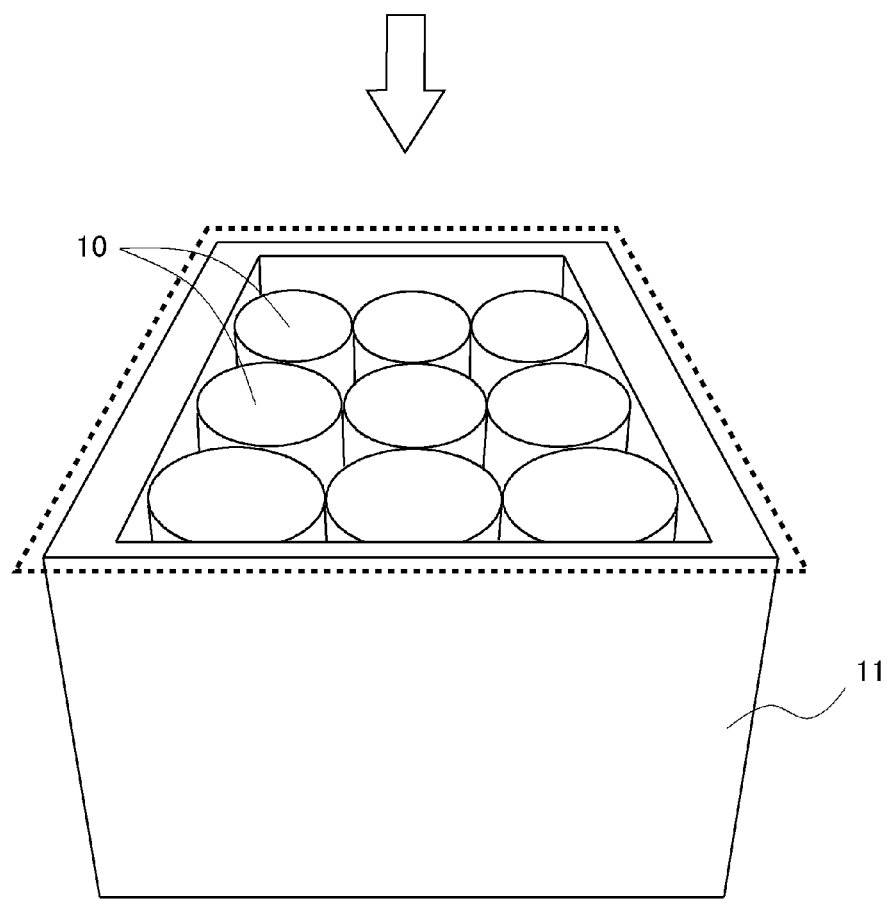

[Fig. 24]
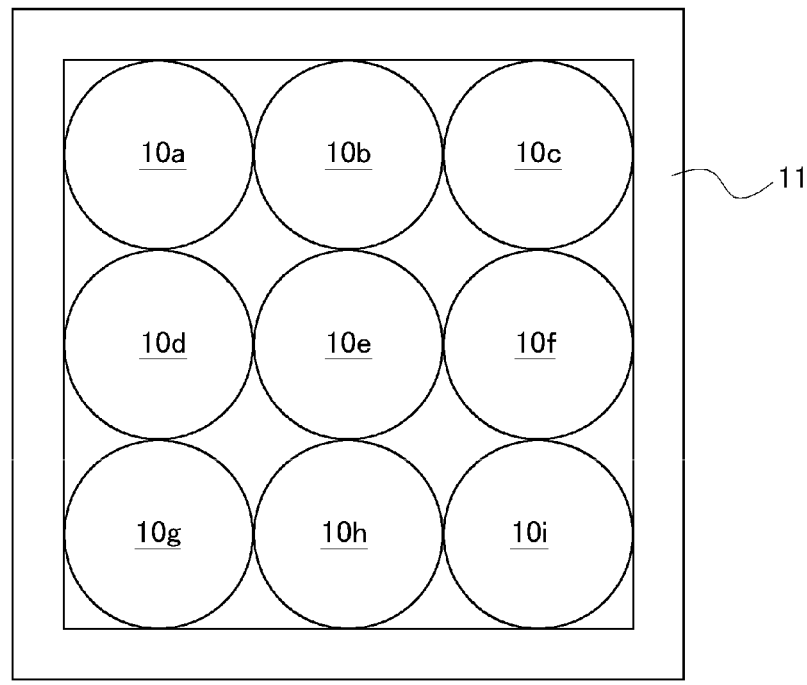
[Fig. 25]
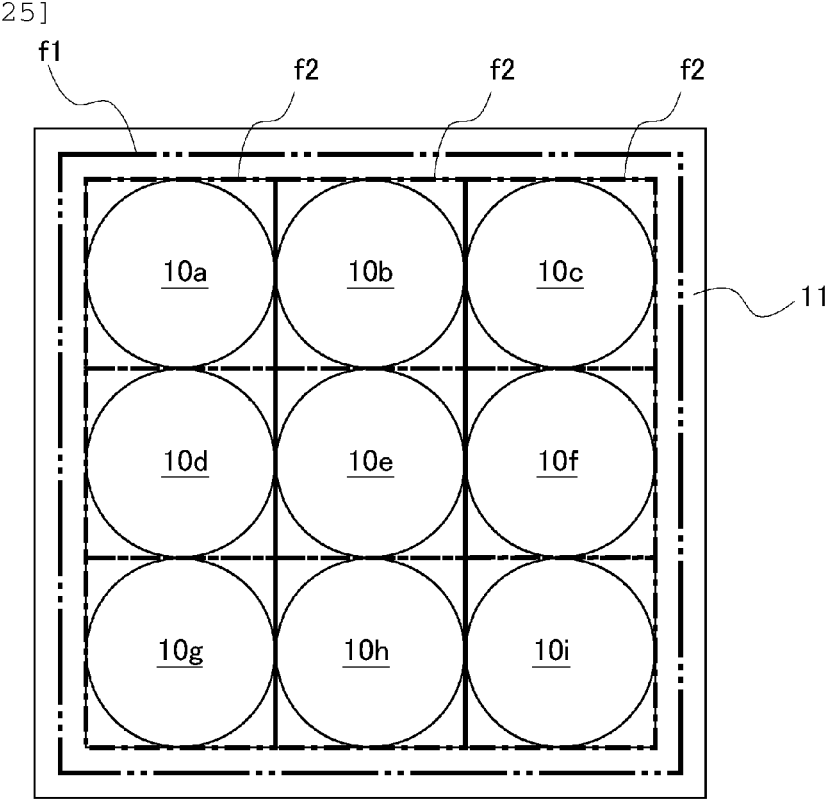

[Fig. 26]
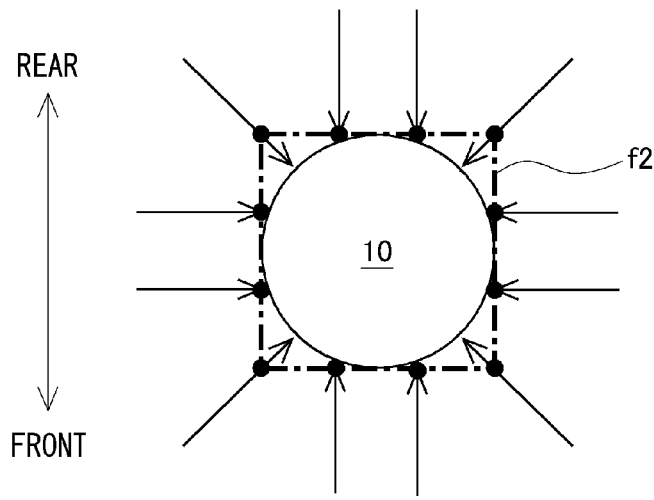
[Fig. 27]
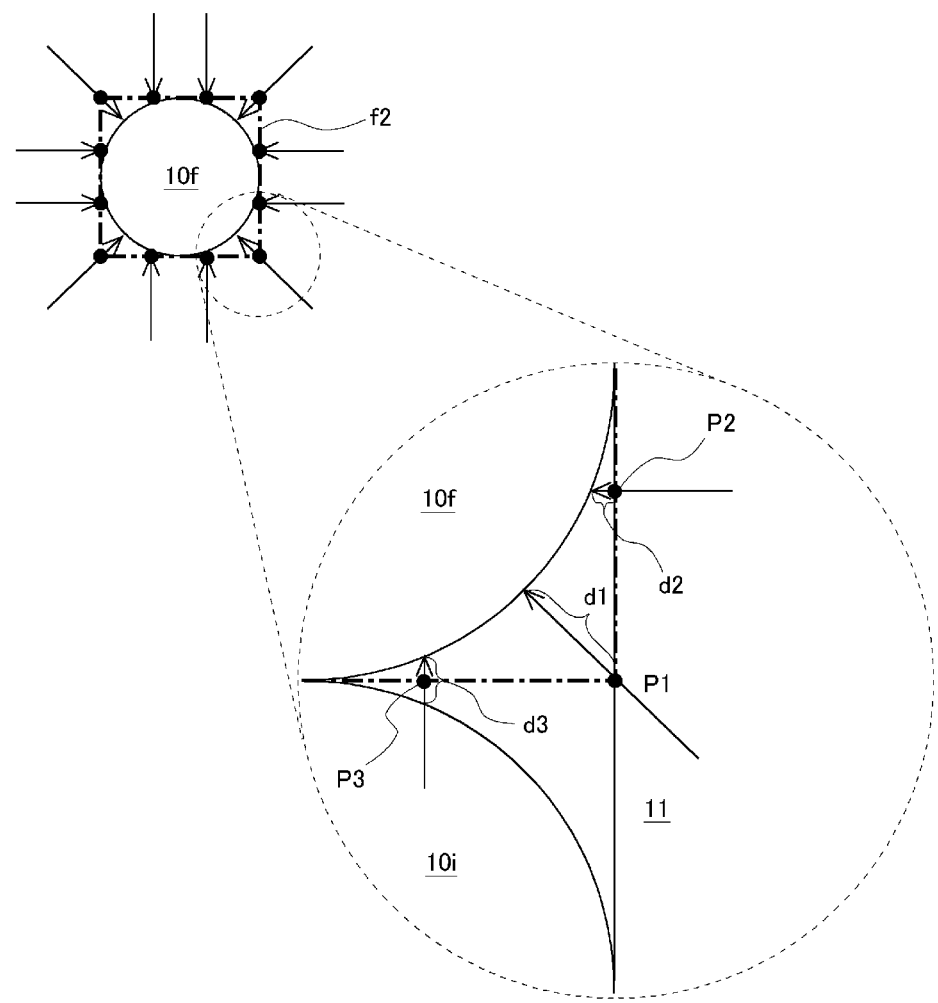

[Fig. 28]
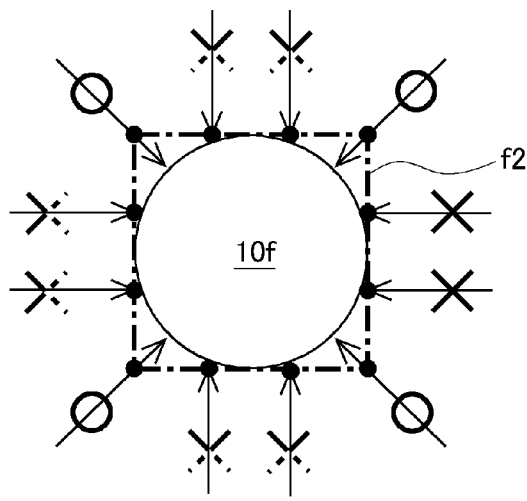
[Fig. 29]
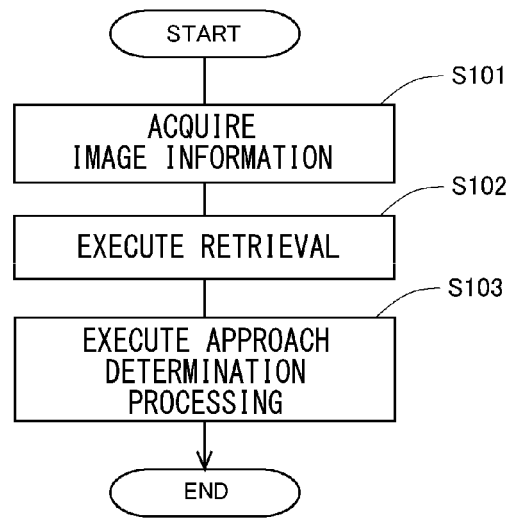

[Fig. 30]
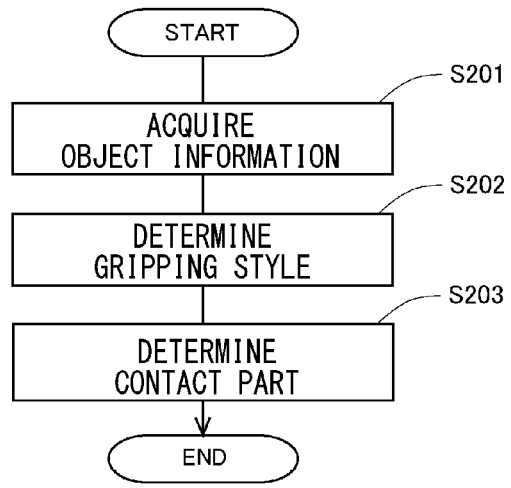
[Fig. 31]
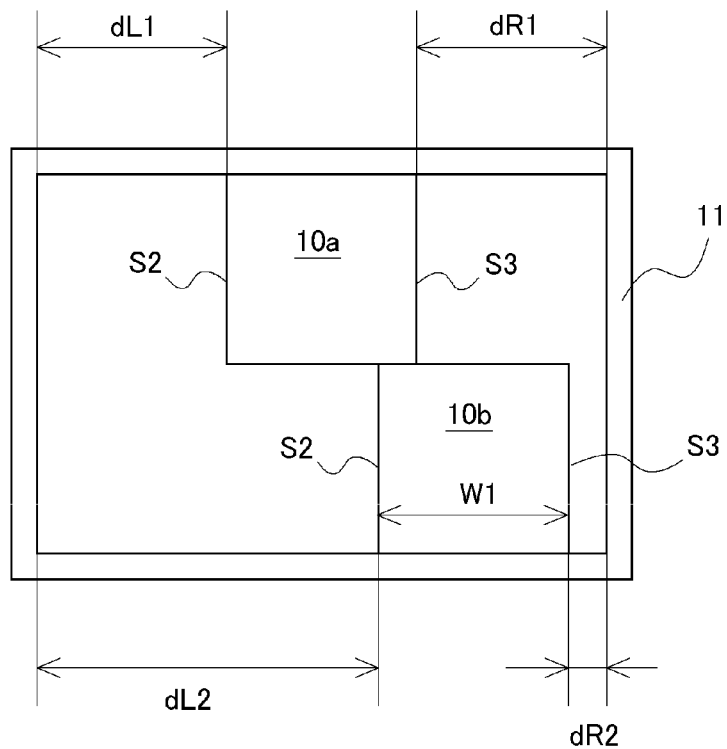

[Fig. 32]
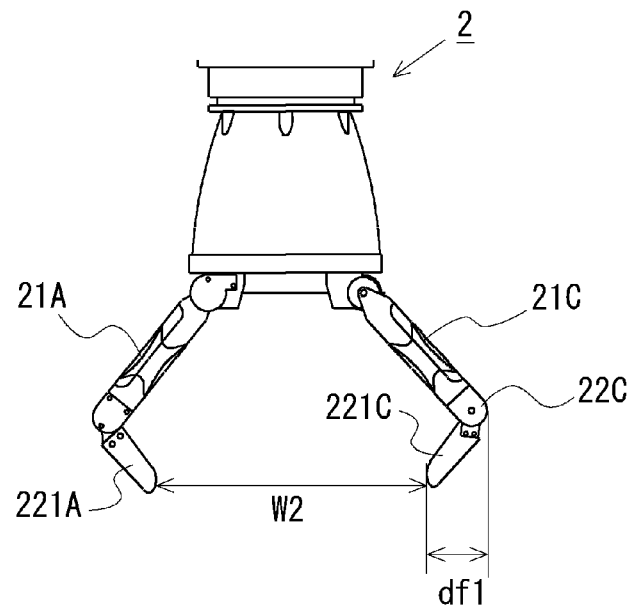
dR2<df1<dR1
[Fig. 33]
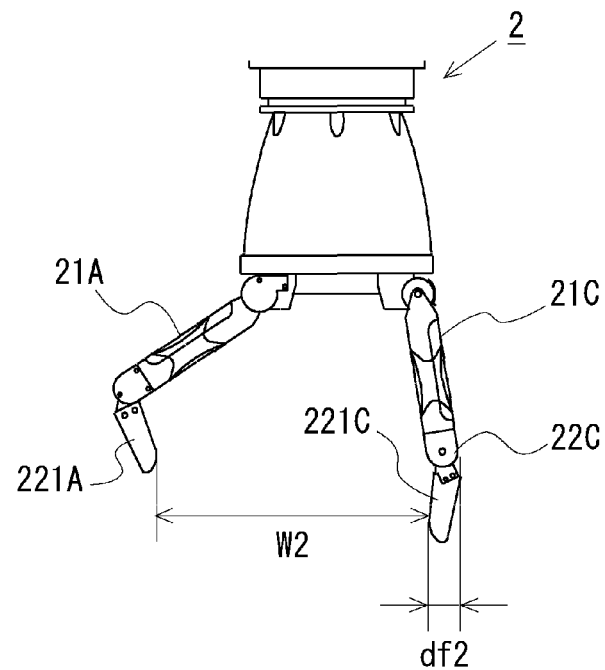
df2<dR2<dR1

IMAGE INFORMATION PROCESSING DEVICE, GRIPPING SYSTEM, AND IMAGE INFORMATION PROCESSING METHOD

TECHNICAL FIELD

The present invention relates to a gripping system for gripping an object by using a hand mechanism having a plurality of finger portions, as well as an image information processing device and an image information processing method for processing image information including the object in the gripping system.

BACKGROUND ART

A gripping system for gripping an object by using a hand mechanism having a plurality of finger portions has been developed in the prior art. A system having an imaging device for capturing an image that includes the object is also known as a gripping system. In this type of a gripping system having an imaging device, the object is recognized on the basis of image information acquired by the imaging device. Also, the hand mechanism is controlled on the basis of the image information so as to grip the recognized object.

PTL 1, for example, discloses a picking system (a gripping system) having a monocular camera that acquires an overall image by photographing a plurality of box-shaped workpieces from above. In addition to the monocular camera, the picking system described in PTL 1 includes a distance sensor for measuring the overall three-dimensional shape of the plurality of box-shaped workpieces. Edge parts of the box-shaped workpieces are detected from the overall image acquired by the monocular camera, and a point group of points that are measured by the distance sensor and correspond to the detected edge parts is extracted using the edge parts as boundaries. Further, on the basis of the extracted point group, the position and attitude of each of the box-shaped workpieces are recognized from the three-dimensional shape measured by the distance sensor. The position and attitude of a box-shaped workpiece to be subjected to picking is then output.

CITATION LIST

Patent Literature

[PTL 1] Japanese Patent No. 5429614

SUMMARY OF INVENTION

Technical Problem

When the hand mechanism attempts to grip an object, first it is necessary to cause the finger portions of the hand mechanism to approach the object and then bring the finger portions into contact with the object. Depending on the manner in which the object is placed, however, parts of the object may be difficult for the finger portions of the hand mechanism to approach. More specifically, when the object is placed such that a certain part of the object is in contact with another object or a housing container housing the object, it is difficult to cause the finger portions of the hand mechanism to approach this contacting part. Moreover, even if a certain part of the object is not in contact with another object or the housing container, when the distance (the interval) between the part and the other object or the housing container is too small, it is likewise difficult to cause the finger portions of the hand mechanism to approach the part. Hence, when an attempt is made to grip an object by using the hand mechanism, it is necessary to ascertain the parts of the object that can be approached by the finger portions of the hand mechanism.

The present invention has been designed in consideration of this problem, and an object thereof is to provide a technique with which it is possible to ascertain parts of an object to be gripped by a hand mechanism, which are approachable by finger portions of the hand mechanism.

Solution to Problem

An image information processing device according to the present invention is a device, which is applied to a gripping system for gripping an object housed in a housing container by using a hand mechanism having a plurality of finger portions, the gripping system including an imaging device for capturing an image including the housing container and at least one object housed in the housing container, and which processes image information acquired by the imaging device, the image information processing device including a retrieval unit which, on the basis of shape information about the housing container and shape information about the object, with the shape information being stored in advance, retrieves the housing container and the object from the image captured by the imaging device, the housing container being retrieved using a first retrieval frame, which is a retrieval frame for retrieving the housing container, and the object being retrieved using a second retrieval frame, which is a retrieval frame for retrieving the object, and a detection unit that detects a part of one object, housed in the housing container, that can be approached by the finger portions of the hand mechanism on the basis of contact states of the one object relative to other objects and the housing container, the contact states being acquired from retrieval results acquired by the retrieval unit, wherein a plurality of determination points are set in advance in predetermined positions on the second retrieval frame, and a predetermined approach direction is set for each of the determination points, and the detection unit determines whether or not the finger portions of the hand mechanism can be caused to approach parts of one object, existing within the second retrieval frame, that correspond respectively to the determination points set on the second retrieval frame from the predetermined approach directions set in relation to the determination points.

Advantageous Effects of Invention

According to the present invention, it is possible to ascertain parts of an object to be gripped by a hand mechanism, which are approachable by finger portions of the hand mechanism.

BRIEF DESCRIPTION OF DRAWINGS

FIG. 1 is a schematic view showing a configuration of a gripping system according to an embodiment.

FIG. 2 is a schematic view showing a configuration of a robot arm according to this embodiment.

FIG. 3 is a perspective view of a hand mechanism according to this embodiment.

FIG. 4 is a top view of the hand mechanism according to this embodiment.

FIG. 5 is a view showing a movement range of a second joint portion of a finger portion on the hand mechanism according to this embodiment.

FIG. 6 is a view showing a movement range of a first joint portion of the finger portion on the hand mechanism according to this embodiment.

FIG. 7 is a block diagram showing function units included respectively in an arm control device, a hand control device, and an image information processing device according to this embodiment.

FIG. 8 is a view showing states of the hand mechanism and an object when the object is gripped by direct gripping.

FIG. 9 is a first view showing an operation for tilting the object using a first finger portion of the hand mechanism in order to grip the object by tilt gripping.

FIG. 10 is a second view showing the operation for tilting the object using the first finger portion of the hand mechanism in order to grip the object by tilt gripping.

FIG. 11 is a view showing a state in which the object has been gripped by a second finger portion, a third finger portion, and a fourth finger portion of the hand mechanism.

FIG. 12 is a first view showing an operation for shifting the position of the object using the first finger portion of the hand mechanism in order to grip the object by shift gripping.

FIG. 13 is a second view showing the operation for shifting the position of the object using the first finger portion of the hand mechanism in order to grip the object by shift gripping.

FIG. 14 is a view showing an image captured by an imaging device according to a first specific example of image information processing.

FIG. 15 is a view showing a projected image acquired when a front face of a housing container is used as a viewpoint, according to the first specific example of the image information processing.

FIG. 16 is a view showing the manner in which the housing container and objects are retrieved from the projected image shown in FIG. 15.

FIG. 17 is a view showing a plurality of determination points set on a second retrieval frame and a predetermined approach direction set in relation to each determination point, according to the first specific example of the image information processing.

FIG. 18 is a view showing some results of approach determination processing according to the first specific example of the image information processing.

FIG. 19 is a view showing an image captured by the imaging device according to a second specific example of the image information processing.

FIG. 20 is a view showing a projected image acquired when a top face of the housing container is used as a viewpoint, according to the second specific example of the image information processing.

FIG. 21 is a view showing the manner in which the housing container and objects are retrieved from the projected image shown in FIG. 20.

FIG. 22 is a view showing some results of the approach determination processing according to the second specific example of the image information processing.

FIG. 23 is a view showing an image captured by the imaging device according to a third specific example of the image information processing.

FIG. 24 is a view showing a projected image acquired when the top face of the housing container is used as a viewpoint, according to the third specific example of the image information processing.

FIG. 25 is a view showing the manner in which the housing container and objects are retrieved from the projected image shown in FIG. 24.

FIG. 26 is a view showing a plurality of determination points set on the second retrieval frame and the predetermined approach direction set in relation to each determination point, according to the third specific example of the image information processing.

FIG. 27 is a view illustrating specific examples of determination distances.

FIG. 28 is a view showing some results of the approach determination processing according to the third specific example of the image information processing.

FIG. 29 is a flowchart showing a flow of image information processing performed by an image information processing device.

FIG. 30 is a flowchart showing a flow of hand control performed by the hand control device when an object is gripped using the hand mechanism.

FIG. 31 is a view showing a housing container 11 and two objects housed in the housing container 11 according to a modified example of this embodiment.

FIG. 32 is a view showing a first approach form according to the modified example of this embodiment.

FIG. 33 is a view showing a second approach form according to the modified example of this embodiment.

MODE FOR CARRYING OUT THE INVENTION

A gripping system according to the present invention is a system for gripping an object housed in a housing container using a hand mechanism having a plurality of finger portions. The gripping system includes an imaging device that captures an image including the housing container and at least one object housed in the housing container. In an image information processing device according to the present invention, a retrieval unit retrieves the housing container and the object from the image captured by the imaging device on the basis of shape information about the housing container and shape information about the object. Further, in the image information processing device, a detection unit detects a part of one object housed in the housing container that can be approached by the finger portions of the hand mechanism on the basis of contact states of the one object relative to other objects and the housing container.

More specifically, the shape information of the housing container and the shape information of the object are stored in the image information processing device in advance. Note that the shape information of the respective components includes not only information relating to the shape of the housing container or the object, but also information relating to the dimensions thereof. The retrieval unit retrieves the housing container and the object from the image captured by the imaging device on the basis of the shape information thereof. At this time, the retrieval unit retrieves the housing container using a first retrieval frame and retrieves the object using a second retrieval frame. The first retrieval frame is a retrieval frame for retrieving the housing container, and the second retrieval frame is a retrieval frame for retrieving the object. More specifically, when the retrieval unit searches the image using the first retrieval frame and detects a shape matching the shape information of the housing container within the first retrieval frame, the retrieval unit recognizes that the housing container exists within the first retrieval frame. Note that the first retrieval frame may be a retrieval frame for retrieving the part of the housing container that houses the objects. Further, when the retrieval unit searches the image using the second retrieval frame and detects a shape matching the shape information of the object within the second retrieval frame, the retrieval unit recognizes that the object exists within the second retrieval frame.

Furthermore, a plurality of determination points are set in advance in predetermined positions on the second retrieval frame. Moreover, a predetermined approach direction is set for each determination point. Here, each determination point indicates a position on the one object existing within the second retrieval frame (in other words, the object whose existence on the image was recognized using the second retrieval frame) in relation to which it is to be determined whether or not that position can be approached by the finger portions of the hand mechanism. Further, the predetermined approach directions indicate approach directions used when the finger portions of the hand mechanism are caused to approach parts corresponding to the respective determination points on the one object existing within the second retrieval frame.

The detection unit then determines, in relation to the one object existing within the second retrieval frame, whether or not the finger portions of the hand mechanism can be caused to approach the parts corresponding to the respective determination points set on the second retrieval frame from the predetermined approach directions set in relation to the determination points. By determining whether or not the finger portions of the hand mechanism can be caused to approach the parts corresponding to the respective determination points on the one object existing within the second retrieval frame in relation to each of the plurality of determination points set on the second retrieval frame in this manner, it is possible to detect the parts of the one object that can be approached by the finger portions of the hand mechanism.

Thus, the form of the hand mechanism when the hand mechanism is caused to approach the one object and the gripping style to be used to grip the one object using the hand mechanism can be determined on the basis of detection results indicating the parts of the one object that can be approached by the finger portions of the hand mechanism. As a result, improvements in stability and tact time can be achieved when an object is gripped using the hand mechanism.

Specific embodiments of the present invention will be described below on the basis of the figures. Unless specified otherwise, the technical scope of the invention is not limited only to the dimensions, materials, shapes, relative arrangements, and so on of constituent components described in the embodiments.

First Embodiment

Here, a case in which the present invention is applied to a gripping system having a robot arm will be described. FIG. 1 is a schematic view showing a configuration of the gripping system according to this embodiment. A gripping system 100 includes a robot arm 1 and an imaging device 8. The imaging device 8 is a camera, for example. The imaging device 8 captures an image including a housing container 11 and at least one object 10 housed in the housing container 11. At this time, the imaging device 8 captures an image including the housing container 11 and the object 10 housed in the housing container 11 from a predetermined direction. Note that the imaging device 8 does not necessarily have to be provided separately to the robot arm 1, as shown in FIG. 1. In other words, the imaging device 8 may be attached to the robot arm 1. Further, the robot arm 1 includes a hand mechanism 2 for gripping the object 10, an arm mechanism 3, and a support portion 4. The configurations of the arm mechanism 3, hand mechanism 2, and support portion 4 of the robot arm 1 will now be described in detail.

(Arm Mechanism)

FIG. 2 is a schematic view showing the configuration of the robot arm 1. The hand mechanism 2 is attached to one end of the arm mechanism 3. Further, the support portion 4 is attached to the other end of the arm mechanism 3. The arm mechanism 3 includes a first arm link portion 31, a second arm link portion 32, a third arm link portion 33, a fourth arm link portion 34, a fifth arm link portion 35, and a connecting member 36. A base portion 20 of the hand mechanism 2 is connected to a first joint portion 30a formed on one end side of the first arm link portion 31 of the arm mechanism 3. A motor (not shown) for rotating the hand mechanism 2 relative to the first arm link portion 31 about the first arm link portion 31 is provided in the first joint portion 30a. The other end side of the first arm link portion 31 is connected to one end side of the second arm link portion 32 by a second joint portion 30b. The first arm link portion 31 and the second arm link portion 32 are connected so that respective central axes thereof intersect perpendicularly. A motor (not shown) for rotating the first arm link portion 31 relative to the second arm link portion 32 axially about the other end side thereof is provided in the second joint portion 30b. Further, the other end side of the second arm link portion 32 is connected to one end side of the third arm link portion 33 by a third joint portion 30c. A motor (not shown) for rotating the second arm link portion 32 relative to the third arm link portion 33 is provided in the third joint portion 30c.

Similarly, the other end side of the third arm link portion 33 is connected to one end side of the fourth arm link portion 34 by a fourth joint portion 30d. Furthermore, the other end side of the fourth arm link portion 34 is connected to the fifth arm link portion 35 by a fifth joint portion 30e. A motor (not shown) for rotating the third arm link portion 33 relative to the fourth arm link portion 34 is provided in the fourth joint portion 30d. Moreover, a motor (not shown) for rotating the fourth arm link portion 34 relative to the fifth arm link portion 35 is provided in the fifth joint portion 30e. Further, the fifth arm link portion 35 is connected to the connecting member 36, which is disposed to extend vertically from the support portion 4, by a sixth joint portion 30f. The fifth arm link portion 35 and the connecting member 36 are connected so that respective central axes thereof are coaxial. A motor (not shown) for rotating the fifth arm link portion 35 about the fifth arm link portion 35 and the connecting member 36 is provided in the sixth joint portion 30f. By configuring the arm mechanism 3 in this manner, the arm mechanism 3 can be realized as a mechanism having six degrees of freedom, for example.

(Hand Mechanism)

Next, the configuration of the hand mechanism 2 will be described on the basis of FIGS. 3 to 6. FIG. 3 is a perspective view of the hand mechanism 2. FIG. 4 is a top view of the hand mechanism 2. Note that in FIG. 4, arrows represent rotation ranges of respective finger portions 21. The hand mechanism 2 includes a base portion 20 connected to the arm mechanism 3, and four finger portions 21 provided on the base portion 20. Further, as shown in FIGS. 3 and 4, in the hand mechanism 2, the four finger portions 21 are disposed on the base portion 20 at equal angular intervals (more specifically, at 90 deg intervals) on a circumference centering on a longitudinal direction (a perpendicular direction to the paper surface in FIG. 4) axis of the hand mechanism 2. Furthermore, the four finger portions 21 all have identical structures and identical lengths. Note, however, that the operations of the respective finger portions 21 are controlled independently.

As shown in FIG. 3, each finger portion 21 includes a first finger link portion 211, a second finger link portion 212, and a base end portion 213. The base end portion 213 of the finger portion 21 is connected to the base portion 20. Here, as indicated by arrows in FIG. 4, the base end portion 213 is connected to the base portion 20 so as to be capable of rotating relative to the base portion 20 about a longitudinal direction (a perpendicular direction to the paper surface in FIG. 4) axis of the finger portion 21. Further, in the finger portion 21, one end of the second finger link portion 212 is connected to the base end portion 213. A second joint portion 23 is formed in a connecting portion between the second finger link portion 212 and the base end portion 213. A motor for driving the base end portion 213 to rotate and a motor for driving the second finger link portion 212 to rotate relative to the base end portion 213 are provided in the interior of the base portion 20. According to this configuration, the base end portion 213 is driven to rotate, and in accordance therewith, the entire finger portion 21 is driven to rotate within a range indicated by an arrow in FIG. 4. Furthermore, as shown in FIG. 5, the second joint portion 23 is formed to be capable of bending and extending.

Further, as shown in FIGS. 3, 5, and 6, in the finger portion 21, one end of the first finger link portion 211 is connected to the other end of the second finger link portion 212. A first joint portion 22 is formed in a connecting portion between the first finger link portion 211 and the second finger link portion 212. A motor for driving the first finger link portion 211 to rotate relative to the second finger link portion 212 is provided in the interior of the second finger link portion 212. According to this configuration, as shown in FIG. 6, the first joint portion 22 is formed to be capable of bending and extending.

Moreover, as shown in FIG. 3, in this embodiment, a pressure sensor 70 is provided on the tip end side of the first finger link portion 211 of the finger portion 21. The pressure sensor 70 is a sensor for detecting external force (pressure) acting on the tip end portion of the first finger link portion 211.

(Support Portion)

Next, configurations of an arm control device 42, a hand control device 43, and an image information processing device 44, which are built into the support portion 4, will be described on the basis of FIG. 7. The arm control device 42 is a control device for controlling the arm mechanism 3 of the robot arm 1. The hand control device 43 is a control device for controlling the hand mechanism 2 of the robot arm 1. The image information processing device 44 is a processing device for processing image information acquired when the imaging device 8 captures an image including the housing container 11 and the object 10. FIG. 7 is a block diagram showing respective function units included in the arm control device 42, the hand control device 43, and the image information processing device 44.

The arm control device 42 is configured to include a plurality of drivers that generate drive signals for driving the motors provided in the respective joint portions of the arm mechanism 3, the drive signal from each driver being supplied to the corresponding motor. The arm control device 42 also includes a computer having a calculation processing device and a memory. The arm control device 42 includes an arm control unit 420 and a motor state quantity acquisition unit 421 as function units. These function units are formed by executing a predetermined control program on the computer included in the arm control device 42.

The arm control unit 420 controls the motors provided respectively in the joint portions 30a, 30b, 30c, 30d, 30e, 30f of the arm mechanism 3 by supplying the drive signals from the respective drivers thereto on the basis of object information acquired by an object information acquisition unit 430, to be described below, which serves as a function unit of the hand control device 43. The arm control unit 420 moves the arm mechanism 3 by controlling the respective motors, whereby the position of the hand mechanism 2 is moved to a desired position (a position in which the object 10 can be gripped by the hand mechanism 2). Further, each of the motors provided in the joint portions 30a, 30b, 30c, 30d, 30e, 30f of the arm mechanism 3 is provided with an encoder (not shown) for detecting state quantities (a rotation position and a rotation speed of a rotary shaft of the motor, and so on) relating to the rotation state of the corresponding motor. The state quantities of the motors, detected by the encoders of the respective motors, are input into the motor state quantity acquisition unit 421 of the arm control device 42. Then, on the basis of the state quantities of the respective motors, input into the motor state quantity acquisition unit 421, the arm control unit 420 servo-controls the respective motors so that the hand mechanism 2 moves to the desired position.

Furthermore, the hand control device 43 is configured to include a plurality of drivers that generate drive signals for driving the motors provided in the hand mechanism 2, the drive signal from each driver being supplied to the corresponding motor. The hand control device 43 also includes a computer having a calculation processing device and a memory. The hand control device 43 includes the object information acquisition unit 430, a hand control unit 431, a motor state quantity acquisition unit 432, and a sensor information acquisition unit 433 as function units. These function units are formed by executing a predetermined control program on the computer included in the hand control device 43.

The object information acquisition unit 430 acquires object information, which is information relating to the object to be gripped by the hand mechanism 2, from the image information processing device 44. Further, the hand control unit 431 controls the motors for driving the respective finger portions 21 of the hand mechanism 2 by supplying drive signals from the drivers thereto on the basis of the object information acquired by the object information acquisition unit 430. As a result, the object 10 is gripped by the plurality of finger portions 21 of the hand mechanism 2. Moreover, each motor of the hand mechanism 2 is provided with an encoder (not shown) for detecting state quantities (the rotation position and rotation speed of the rotary shaft of the motor, and so on) relating to the rotation state of the corresponding motor. The state quantities of the motors, detected by the encoders of the motors, are input into the motor state quantity acquisition unit 432 of the hand control device 43. Then, on the basis of the state quantities of the motors, input into the motor state quantity acquisition unit 432, the hand control unit 431 servo-controls the motors of the respective finger portions 21 so that the plurality of finger portions 21 grip the object.

The hand control device 43 also includes a sensor information acquisition unit (not shown). Detection values from the pressure sensors 70 provided in the first finger link portions 211 of the respective finger portions 21 of the hand mechanism 2 are input into the sensor information acquisition unit. Then, when the pressure sensors 70 detect contact with the object by the finger portions 21, the hand control unit 431 can control the motors of the respective finger portions 21 on the basis of detection signals therefrom.

The image information processing device 44 includes a computer having a calculation processing device and a memory. Further, the image information processing device 44 includes an image information acquisition unit 440, a retrieval unit 441, and a detection unit 442 as function units. These function units are formed by executing a predetermined control program on the computer included in the image information processing device 44. The image information processing device 44 also includes a storage unit 443. The storage unit 443 is means for storing shape information about the housing container 11, shape information about the object 10, and so on. The shape information of the housing container 11 and the shape information of the object 10, stored by the storage unit 443, are registered in advance by a user. Note that the shape information of the respective components includes not only information relating to the shape of the housing container 11 or the object 10, but also information relating to the dimensions thereof. Further, image information processing results generated by the image information processing device 44 are input into the object information acquisition unit 430 of the hand control unit 431. Note that functions realized by the respective function units of the image information processing device 44 will be described below.

Note that in FIG. 7, the arm control device 42 and the hand control device 43 are shown separately as control devices included in the gripping system, but as a different method, a configuration in which the respective function units are formed in a single control device integrating the two devices may be employed. Further, likewise in a case where the control devices included in the gripping system are separated into the arm control device 42 and the hand control device 43, the function units shown in FIG. 7 may essentially be formed in either of the control devices, as long as no technical inconsistencies occur as a result, and information may be exchanged appropriately as required between the arm control device 42 and the hand control device 43. A configuration in which some of the function units of either the arm control device 42 or the hand control device 43 are formed in a separate control device to the arm control device 42 and the hand control device 43 may also be employed.

(Gripping Styles)

Here, specific examples of gripping styles realized when the object 10 is gripped by the hand mechanism 2 of the robot arm 1 in the gripping system 100 according to this embodiment will be described on the basis of FIGS. 8 to 13. FIG. 8 is a view illustrating direct gripping, which is a gripping style in which the object 10 is gripped by the hand mechanism 2 in the state in which the object 10 is placed. Further, FIGS. 9 to 11 are views illustrating tilt gripping, which is a gripping style in which the object 10 is tilted before being gripped by the hand mechanism 2. FIGS. 12 and 13 are views illustrating shift gripping, which is a gripping style in which the position of the object 10 is shifted before the object 10 is gripped by the hand mechanism 2. Note that here, the finger portions 21 of the hand mechanism 2 will be referred to respectively as a first finger portion 21A, a second finger portion 21B, a third finger portion 21C, and a fourth finger portion 21D.

FIG. 8 shows the states of the hand mechanism 2 and the object 10 when the object 10 is gripped by direct gripping. In direct gripping, as shown in FIG. 8, the placed object 10 is sandwiched between and gripped by the finger portions 21 of the hand mechanism 2 as is. Note that the object 10 does not necessarily have to be sandwiched between all four of the finger portions 21 of the hand mechanism 2, and as long as the object 10 can be sandwiched between at least two of the finger portions 21, direct gripping is established. Gripping of the object 10 by direct gripping can be implemented in any situation where the finger portions 21 of the hand mechanism 2 can be brought into contact with each of two mutually opposing parts of the object 10.

Further, FIGS. 9 and 10 show an operation for tilting the object 10 using the first finger portion 21A of the hand mechanism 2 in order to grip the object 10 by tilt gripping. Furthermore, FIG. 11 shows a state in which the object 10 has been gripped by the second finger portion 21B, the third finger portion 21C, and the fourth finger portion 21D of the hand mechanism 2.

More specifically, in FIG. 9, the object 10 is placed side by side and in contact with another, adjacent object 10'. Even in this case, the finger portions 21 of the hand mechanism 2 can contact an upper face S1 of the object 10. Therefore, first, as shown in FIG. 9, the first finger link portion 211A of the first finger portion 21A is brought into contact with the upper face S1 of the object 10. Note that at this time, in a state where the first finger portion 21A is in contact with the upper face S1 of the object 10, the other finger portions 21B, 21C, 21D of the hand mechanism 2 do not contact the object 10. Next, as shown in FIG. 10, the object 10 is tilted forward by the first finger portion 21A while the first finger link portion 211A contacts the upper face S1 of the object 10. By modifying the attitude of the object 10 using the first finger portion 21A in this manner, the interval between the object 10 and the adjacent object 10' can be increased. As a result, a situation in which the finger portions 21 of the hand mechanism 2 can be brought into contact with a side face of the object 10 that could not be contacted by the finger portions 21 of the hand mechanism 2 while the object 10 was placed in contact with the adjacent object 10' is established. Next, as shown in FIG. 11, with the object 10 having been tilted by the first finger portion 21A, the object 10 is sandwiched between and gripped by the second finger portion 21B, the third finger portion 21C, and the fourth finger portion 21D. Gripping of the object 10 by tilt gripping can be implemented in any situation where the object 10 can be tilted by the hand mechanism 2, even in a state where the finger portions 21 of the hand mechanism 2 cannot be brought into contact with mutually opposing parts of the object 10.

Further, FIGS. 12 and 13 are views showing an operation for shifting the position of the object 10 using the first finger portion 21A of the hand mechanism 2 in order to grip the object 10 by shift gripping.

More specifically, in FIG. 12, the object 10 is placed side by side and in contact with another, adjacent object 10'. Even in this case, the finger portions 21 of the hand mechanism 2 can contact a side face S2 of the object 10, which opposes a side face S3 that is in contact with the other object 10'. Therefore, first, as shown in FIG. 12, the first finger link portion 211A of the first finger portion 21A is brought into contact with the side face S2 of the object 10. The object 10 is then pressed against the other object 10' as is by pressing the side face S2 of the object 10 using the first finger portion 21A, and while the object 10 is being pressed, the position of the object 10 is shifted by the first finger portion 21A in a direction indicated by a black-outlined arrow.

Thus, as shown in FIG. 13, the position of the object 10 moves upward, and as a result, the object 10 projects upward beyond the height of the upper face S1 of the other object 10'. In other words, on the object 10, the upper part of the side face S3 contacting the other object 10' is exposed. Hence, the finger portions 21 (the finger portions 21 other than the first finger portion 21A) of the hand mechanism 2 can contact not only the side face S2 of the object 10 but also the side face S3 opposing the side face S2. The finger portions 21 of the hand mechanism 2 are then brought into contact with the side face S2 and the side face S3 of the object 10 in the state shown in FIG. 16 such that the object 10 is sandwiched between the finger portions 21 and gripped thereby. Gripping of the object 10 by tilt gripping can be implemented in any situation where it is possible to shift the position of the object 10 using the hand mechanism 2, even in a state where the finger portions 21 of the hand mechanism 2 cannot be brought into contact with mutually opposing parts of the object 10.

In the gripping system 100 according to this embodiment, as described above, the object 10 can be gripped using various gripping styles, including direct gripping, tilt gripping, and shift gripping, which are realized by the hand mechanism 2. Note that in FIGS. 8 to 13, the object 10 has a rectangular parallelepiped shape, but even when the object 10 has a different shape, tilt gripping and shift gripping can be implemented in addition to direct gripping.

In order to grip the object 10 using the various gripping styles described above, it is necessary in all cases to bring the finger portions 21 of the hand mechanism 2 into contact with the object 10. For this purpose, it is necessary to ascertain the parts (also referred to hereafter as "approachable parts") of the object 10 housed in the housing container 11 that can be approached by the finger portions 21 of the hand mechanism 2. Hence, in the gripping system 100 according to this embodiment, the approachable parts of the object 10 housed in the housing container 11 are detected by processing, in the image information processing device 44, the image information acquired when the imaging device 8 captures an image including the housing container 11 and the object 10.

(Image Information Processing)

Specific examples of the image information processing performed in the image information processing device 44 will be described below. First, a first specific example will be described on the basis of FIGS. 14 to 18. FIG. 14 is a view showing an image acquired when the imaging device 8 photographs the housing container 11 and a plurality of objects 10 housed in the housing container 11 according to the first specific example. In this specific example, as shown in FIG. 14, the housing container 11 takes the shape of a box in which a front part (a front side face) and an upper part (a top face) are open. Further, the objects 10 have a rectangular parallelepiped shape. Twelve objects 10 are housed in the housing container 11 in rows without gaps. As noted above, the shape information of the housing container 11 and the shape information of the object 10 are stored in the storage unit 443 of the image information processing device 44 in advance.

In the gripping system 100, the imaging device 8 captures an image including the housing container 11 and the objects 10 in the state described above from a direction in which the front faces thereof are visible. FIG. 15 is a view showing an image acquired by projecting the image captured by the imaging device 8 from a viewpoint in front of the housing container 11 (in other words, a projected image taken from the direction of a black-outlined arrow in FIG. 14). As shown in FIG. 15, the projected image includes the housing container 11 and three objects 10a to 10c disposed in the frontmost part of the housing container 11.

In the image information processing device 44, an image such as that shown in FIG. 14 is acquired by the image information acquisition unit 440 as image information. Then, in the image information processing device 44, the retrieval unit 441 retrieves the housing container 11 and the objects 10 from a projected image such as that shown in FIG. 15, which is acquired on the basis of the image captured by the imaging device 8. FIG. 16 is a view showing the manner in which the housing container 11 and the objects 10 are retrieved from the projected image shown in FIG. 15.

In the image information processing device 44, the retrieval unit 441 retrieves the housing container 11 using a first retrieval frame, which is a retrieval frame for retrieving the housing container, and retrieves the object 10 using a second retrieval frame, which is a retrieval frame for retrieving the object. In FIG. 16, a frame f1 indicated by dot-dot-dash lines denotes the first retrieval frame, and a frame f2 indicated by dot-dash lines denotes the second retrieval frame. Here, the first retrieval frame f1 is set on the basis of the shape information of the housing container 11, which is registered in the storage unit 443. As shown in FIG. 16, the first retrieval frame f1 is set as a retrieval frame for retrieving the part of the housing container 11 that houses the objects 10. Further, the second retrieval frame f2 is set on the basis of the shape information of the object 10, which is registered in the storage unit 443. As shown in FIG. 16, the second retrieval frame f2 is set in accordance with the size of the object 10 on the image (more specifically, the size of an outer periphery of the object 10 when the object 10 is seen from the front). Furthermore, the first retrieval frame f1 and the second retrieval frame f2 are both rectangular. Note, however, that the first retrieval frame f1 and the second retrieval frame f2 do not necessarily have to be rectangular and may have a different polygonal shape.

As shown in FIG. 16, when the retrieval unit 441 searches the image using the first retrieval frame f1 and detects, within the first retrieval frame f1, a shape matching the shape information relating to the part of the housing container 11 that houses the objects 10, the retrieval unit 441 recognizes that the part of the housing container 11 that houses the objects 10 exists within the first retrieval frame f1. Further, when the retrieval unit 441 searches the image using the second retrieval frame f2 and detects a shape matching the shape information of the object 10 within the second retrieval frame f2, the retrieval unit 441 recognizes that the object 10 exists within the second retrieval frame f2. As a result of the retrieval performed by the retrieval unit 441 in this manner, it is recognized in the image information processing device 44 that three objects 10a to 10c are arranged in the housing container 11 in a row without gaps.

Furthermore, a plurality of determination points are set in advance in predetermined positions on the second retrieval frame f2. Moreover, a predetermined approach direction is set for each determination point. FIG. 17 is a view showing the plurality of determination points set on the second retrieval frame f2 and the predetermined approach direction set for each determination point.

Here, each determination point indicates a position, on the one object 10 existing within the second retrieval frame f2, in relation to which it is to be determined whether or not the finger portions 21 of the hand mechanism 2 can approach that position. In FIG. 17, black circles on the second retrieval frame f2 indicate the determination points. As shown in FIG. 17, determination points are set in a total of twelve locations on the second retrieval frame f2, namely one at each vertex and in two locations on each side. Further, the predetermined approach directions indicate approach directions used when the finger portions 21 of the hand mechanism 2 are caused to approach parts corresponding to the respective determination points on the one object 10 existing within the second retrieval frame f2. In FIG. 17, arrows set respectively in relation to the black circles denote the predetermined approach directions. As shown in FIG. 17, directions that are orthogonal to the respective sides of the second retrieval frame f2 are set as the predetermined approach directions in relation to the determination points set on the respective sides. Further, two directions that are respectively orthogonal to the two sides forming each of the vertices of the second retrieval frame f2 are set as the predetermined approach directions in relation to the determination points set on the respective vertices.

In the image information processing device 44, the detection unit 442 then detects the approachable parts of each of the objects 10 whose existence was recognized on the image, as shown in FIG. 16, as a result of the retrieval performed by the retrieval unit 441. At this time, the detection unit 442 detects the approachable parts of one object 10 on the basis of contact states of the one object 10 relative to the other objects 10 and the housing container 11, the contact states being acquired from the retrieval results acquired by the retrieval unit 441.

More specifically, the detection unit 442 determines whether or not the finger portions 21 of the hand mechanism 2 can be caused to approach the parts of the one object 10 existing within the second retrieval frame f2 that correspond respectively to the determination points set on the second retrieval frame f2 from the predetermined approach directions set in relation to the determination points. Hereafter, this determination processing performed by the detection unit 442 may be referred to as "approach determination processing". Further, to facilitate description of the approach determination processing, a case in which it is determined during the approach determination processing that the finger portions 21 of the hand mechanism 2 can be caused to approach a part corresponding to a determination point on the object 10 from the predetermined approach direction set in relation to the determination point may be referred to as "an approach vector is established". Furthermore, a case in which it is determined during the approach determination processing that the finger portions 21 of the hand mechanism 2 cannot be caused to approach a part corresponding to a determination point on the object 10 from the predetermined approach direction set in relation to the determination point may be referred to as "an approach vector is not established".

FIG. 18 is a view showing some results of the approach determination processing performed by the detection unit 442. FIG. 18 shows results of the approach determination processing performed in relation to the objects 10b, 10c shown in FIG. 16. In FIG. 18, a circle on an arrow indicating a predetermined approach direction indicates that an approach vector is established. Further, in FIG. 18, a cross on an arrow indicating a predetermined approach direction indicates that an approach vector is not established. Note that a solid-line cross indicates that an approach vector is not established due to the one object 10 in the retrieval frame f2 being in contact with the housing container 11. Further, a dot-dash-line cross indicates that an approach vector is not established due to the one object 10 in the retrieval frame f2 being in contact with another object 10. In this embodiment, as described above, the retrieval unit 441 retrieves the housing container 11 and the objects 10. The detection unit 442 then executes the approach determination processing on each object 10 on the basis of the retrieval results acquired by the retrieval unit 441. As a result, it is possible to determine whether the contact partner of the one object 10 existing within the retrieval frame f2 is the housing container 11 or another object 10.

As described above, the three objects 10a to 10c are disposed in the housing container 11 in a row without gaps. Hence, as shown in FIG. 18, on both of the objects 10b, 10c, an approach vector is not established in relation to the determination points set in positions corresponding to the lower face and the side faces of each of the objects 10b, 10c. In other words, during the approach determination processing, when another object 10 or the housing container 11 is in contact with a part of the one object 10 existing within the second retrieval frame f2 that corresponds to a determination point set on the second retrieval frame f2 from the predetermined approach direction set in relation to the determination point, the detection unit 442 determines that the finger portions 21 of the hand mechanism 2 cannot be caused to approach the part of the one object 10 that corresponds to the determination point from the predetermined approach direction.

On the other hand, on both of the objects 10b, 10c, an approach vector is basically established in relation to the predetermined approach directions indicating approach from above on the determination points set in positions corresponding to the respective upper faces of the objects 10b, 10c. In other words, on each of the objects 10b, 10c, approach vectors are established in relation to the determination points in the two locations set on the upper side of the retrieval frame f2.

Further, in the object 10b, approach vectors are established in relation to the predetermined approach directions indicating approach from above on the determination points set on the two vertices forming the two ends of the upper side of the retrieval frame f2. Also, in the object 10c, an approach vector is established in relation to the predetermined approach direction indicating approach from above on the determination point set on the vertex on the object 10b side (the left side in FIG. 18), of the two vertices forming the two ends of the upper side of the retrieval frame f2. Note, however, that in the object 10c, an approach vector is not established in relation to the predetermined approach direction indicating approach from above on the determination point set on the vertex on the side of a side wall of the housing container 11 (the right side in FIG. 18), of the two vertices forming the two ends of the upper side of the retrieval frame f2. The reason for this, as shown in FIGS. 14 and 15, is that the height of the side wall of the housing container 11 that is contacted by the object 10c is higher than the height of the object 10c. In this case, even though the top of the housing container 11 is open, the side wall of the housing container 11 obstructs the end portion of the upper face of the object 10c on the side of the side wall of the housing container 11, making it impossible to bring the finger portions 21 of the hand mechanism 2 into contact therewith. Hence, as described above, in the object 10c, an approach vector is not established in relation to the predetermined approach direction indicating approach from above on the determination point set on the vertex on the side of the side wall of the housing container 11, of the two vertices forming the two ends of the upper side of the retrieval frame f2.

In other words, in the approach determination processing, the detection unit 442 determines that the finger portions 21 of the hand mechanism 2 cannot be caused to approach a vertex formed by a side that contacts the housing container 11 on the outer periphery of the image of the one object 10 and another side from either of the two predetermined approach directions set in relation to the determination point set on the vertex of the second retrieval frame f2 that corresponds to this vertex.

Next, a second specific example will be described on the basis of FIGS. 19 to 22. FIG. 19 is a view showing an image acquired when the imaging device 8 photographs the housing container 11 and the plurality of objects 10 housed in the housing container 11 according to the second specific example. In this specific example, as shown in FIG. 19, the housing container 11 takes the shape of a box in which only the upper part (the top face) is open. Further, similarly to the first specific example, the objects 10 have a rectangular parallelepiped shape. Nine objects 10 are housed in the housing container 11 in rows. Here, the nine objects 10 are housed in the housing container 11 so as to packed into the front side. Therefore, in the part of the housing container 11 housing the nine objects 10, no gaps are formed between the objects 10 and between the objects 10 and the housing container 11. However, a space where no objects 10 are placed is formed in the rear part of the housing container 11. As noted above, likewise in this specific example, the shape information of the housing container 11 and the shape information of the object 10 are stored in the storage unit 443 of the image information processing device 44 in advance.

In the gripping system 100, the imaging device 8 captures an image including the housing container 11 and the objects 10 in the state described above from a direction in which the upper faces thereof are visible. FIG. 20 is a view showing an image acquired by projecting the image captured by the imaging device 8 from a viewpoint above the housing container 11 (in other words, a projected image taken from the direction of a black-outlined arrow in FIG. 19). As shown in FIG. 20, the projected image includes the housing container 11 and nine objects 10a to 10i housed in the housing container 11.

In the image information processing device 44, an image such as that shown in FIG. 19 is acquired by the image information acquisition unit 440 as image information. Then, in the image information processing device 44, the retrieval unit 441 retrieves the housing container 11 and the objects 10 from a projected image such as that shown in FIG. 20, which is acquired on the basis of the image captured by the imaging device 8. FIG. 21 is a view showing the manner in which the housing container 11 and the objects 10 are retrieved from the projected image shown in FIG. 20.

Likewise in this specific example, similarly to the first specific example, the retrieval unit 441 retrieves the housing container 11 using the first retrieval frame f1, which is a retrieval frame for retrieving the housing container, and retrieves the object 10 using the second retrieval frame f2, which is a retrieval frame for retrieving the object. Further, as shown in FIG. 21, the first retrieval frame f1 is set as a retrieval frame for retrieving the part of the housing container 11 housing the objects 10. Furthermore, as shown in FIG. 21, the second retrieval frame f2 is set in accordance with the size of the object 10 on the image (in other words, the size of the outer periphery of the object 10 when the object 10 is seen from above). As a result of the retrieval performed by the retrieval unit 441, it is recognized in the image information processing device 44 that the nine objects 10a to 10i are arranged in the front part of the housing container 11 in rows without gaps.

Furthermore, likewise in this specific example, similarly to the first specific example, a plurality of determination points are set on the second retrieval frame f2, and similarly to the first specific example, a predetermined approach direction is set for each determination point. Moreover, likewise in this specific example, the approach determination processing is performed by the detection unit 442 on the basis of the contact states of the one object 10 relative to the other objects 10 and the housing container 11, the contact states being acquired from the retrieval results acquired by the retrieval unit 441.

FIG. 22 is a view showing some results of the approach determination processing performed by the detection unit 442. FIG. 22 shows results of the approach determination processing performed in relation to the objects 10b, 10c shown in FIG. 21. Note that similarly to FIG. 18, in FIG. 22, black circles on the second retrieval frame f2 indicate the determination points. Further, in FIG. 22, arrows set in relation to the black circles indicate the predetermined approach directions. Furthermore, in FIG. 22, a black circle on an arrow indicating a predetermined approach direction indicates that an approach vector is established. Moreover, in FIG. 22, a cross on an arrow indicating a predetermined approach direction indicates that an approach vector is not established. Note that a solid-line cross indicates that an approach vector is not established due to the one object 10 in the retrieval frame f2 being in contact with the housing container 11. Further, a dot-dash-line cross indicates that an approach vector is not established due to the one object 10 in the retrieval frame f2 being in contact with another object 10.

As noted above, the nine objects 10a to 10i are arranged in the front part of the housing container 11 in rows without gaps. Therefore, as shown in FIG. 22, on both of the objects 10b, 10c, an approach vector is not established in relation to any of the determination points set in positions corresponding to the front side faces, right-side side faces, and left-side side faces of the objects 10b, 10c.

However, as shown in FIG. 21, a space is formed in the rear part of the housing container 11 behind the objects 10a to 10c. Therefore, on both of the objects 10b, 10c, an approach vector is basically established in relation to the predetermined approach directions indicating approach from the rear on the determination points set in positions corresponding to the rear side faces of the objects 10b, 10c. In other words, on both of the objects 10b, 10c, approach vectors are established for the determination points in the two locations set on the rear side of the retrieval frame f2.

Further, in the object 10b, approach vectors are also established in relation to the predetermined approach directions indicating approach from the rear on the determination points set on the two vertices forming the two ends of the rear side of the retrieval frame f2. Also, in the object 10c, an approach vector is established in relation to the predetermined approach direction indicating approach from the rear on the determination point set on the vertex on the object 10b side (the left side in FIG. 22), of the two vertices forming the two ends of the rear side of the retrieval frame f2. Note, however, that in the object 10c, an approach vector is not established in relation to the predetermined approach direction indicating approach from the rear on the determination point set on the vertex on the side of the side wall of the housing container 11 (the right side in FIG. 22), of the two vertices forming the two ends of the rear side of the retrieval frame f2. The reason for this, as shown in FIG. 21, is that even though a space is formed in the rear part of the housing container 11 behind the objects 10a to 10c, the side wall of the housing container 11 obstructs the end portion of the rear side face of the object 10c on the side of the side wall of the housing container 11, making it impossible to bring the finger portions 21 of the hand mechanism 2 into contact therewith.

Note that in the first and second specific examples described above, when another object 10 or the housing container 11 is in contact with the one object 10 existing within the second retrieval frame f2, it is determined that an approach vector is not established. However, even when the one object 10 is not in contact with another object 10 or the housing container 11, the finger portions 21 of the hand mechanism 2 cannot be caused to approach the one object 10 in a part where the gap between the two components is too small. Therefore, in the approach determination processing, when a distance (also referred to hereafter as a "determination distance") between a part of the one object 10 in the second retrieval frame f2 that corresponds to a determination point set on the second retrieval frame f2 and another object 10 or the housing container 11 in the predetermined approach direction set in relation to the determination point is equal to or shorter than a predetermined threshold, it may be determined that the finger portions 21 of the hand mechanism 2 cannot be caused to approach the part of the one object 10 corresponding to the determination point from the predetermined approach direction.

Next, a third specific example will be described on the basis of FIGS. 23 to 28. FIG. 23 is a view showing an image acquired when the imaging device 8 photographs the housing container 11 and the plurality of objects 10 housed in the housing container 11 according to the third specific example. In this specific example, as shown in FIG. 23, the housing container 11 takes the shape of a box in which only the upper part (the top face) is open. Further, the objects 10 have a columnar shape. Nine objects 10 are housed in the housing container 11 in rows so that adjacent objects 10 contact each other. Further, in the housing container 11, the objects 10 disposed in positions adjacent to the side walls of the housing container 11 also contact the housing container 11. As noted above, likewise in this specific example, the shape information of the housing container 11 and the shape information of the object 10 are stored in the storage unit 443 of the image information processing device 44 in advance.

In the gripping system 100, the imaging device 8 captures an image including the housing container 11 and the objects 10 in the state described above from a direction in which the upper faces thereof are visible. FIG. 24 is a view showing an image acquired by projecting the image captured by the imaging device 8 from a viewpoint above the housing container 11 (in other words, a projected image taken from the direction of a black-outlined arrow in FIG. 23). As shown in FIG. 24, the projected image includes the housing container 11 and the nine objects 10a to 10i housed in the housing container 11.

In the image information processing device 44, an image such as that shown in FIG. 23 is acquired by the image information acquisition unit 440 as image information. Then, in the image information processing device 44, the retrieval unit 441 retrieves the housing container 11 and the objects 10 from a projected image such as that shown in FIG. 24, which is acquired on the basis of the image captured by the imaging device 8. FIG. 25 is a view showing the manner in which the housing container 11 and the objects 10 are retrieved from the projected image shown in FIG. 24.

Likewise in this specific example, similarly to the first specific example, the retrieval unit 441 retrieves the housing container 11 using the first retrieval frame f1, which is a retrieval frame for retrieving the housing container, and retrieves the object 10 using the second retrieval frame f2, which is a retrieval frame for retrieving the object. Further, as shown in FIG. 25, the first retrieval frame f1 is set as a retrieval frame for retrieving the part of the housing container 11 housing the objects 10. Furthermore, as shown in FIG. 25, the second retrieval frame f2 is set in accordance with the size of the object 10 on the image (in other words, the size of the outer periphery of the object 10 when the object 10 is seen from above). Note that in this specific example, the objects 10 have a columnar shape, and therefore, as shown in FIG. 25, the shape of the outer periphery of the object 10 when the object 10 is seen from above is circular. Note, however, that likewise in this case, the second retrieval frame f2 is rectangular. Also note that likewise in this case, the second retrieval frame f2 may have a polygonal shape other than a rectangle.

As a result of the retrieval performed by the retrieval unit 441, it is recognized in the image information processing device 44 that the nine objects 10a to 10i are housed in the housing container 11 in rows so that adjacent objects 10 contact each other, and the objects 10a to 10d and 10f to 10i disposed in positions adjacent to the side walls of the housing container 11 also contact the housing container 11.

Furthermore, likewise in this specific example, similarly to the first specific example, a plurality of determination points are set on the second retrieval frame f2. Also, a predetermined approach direction is set for each determination point. Note, however, that in this specific example, since the objects 10 have a columnar shape, the method of setting predetermined approach directions in relation to the determination points partially differs from the first specific example. More specifically, the predetermined approach directions set in relation to the determination points set on the vertices of the second retrieval frame f2 differ from the first specific example.

FIG. 26 is a view showing the plurality of determination points set on the second retrieval frame f2 and the predetermined approach directions set in relation to the determination points. Similarly to FIG. 17, in FIG. 26, black circles on the second retrieval frame f2 indicate the determination points. Further, in FIG. 26, arrows set in relation to the black circles indicate the predetermined approach directions. As shown in FIG. 26, likewise in this specific example, similarly to the first specific example, determination points are set in a total of twelve locations on the second retrieval frame f2, namely one at each vertex and in two locations on each side. Furthermore, as shown in FIG. 26, directions that are orthogonal to the respective sides of the second retrieval frame f2 are set as the predetermined approach directions in relation to the determination points set on the respective sides. With respect to the determination points set on the vertices of the second retrieval frame f2, meanwhile, directions of diagonal lines extending from the respective vertices are set as the predetermined approach directions.

Likewise in this specific example, the approach determination processing is performed by the detection unit 442 on the basis of the contact states of the one object 10 relative to the other objects 10 and the housing container 11, the contact states being acquired from the retrieval results acquired by the retrieval unit 441. Note, however, that in this specific example, since the objects 10 have a columnar shape, the parts of the one object 10 that correspond to the determination points do not contact another object 10 or the housing container 11. Nevertheless, as noted above, even when the one object 10 does not contact another object 10 or the housing container 11, the finger portions of the hand mechanism 2 cannot be caused to approach the one object 10 in parts where the interval between the two components is too small. In this specific example, therefore, the approach determination processing is performed on the basis of the determination distance relating to each determination point.

FIG. 27 is a view illustrating specific examples of determination distances. Here, the determination distance will be described using the object 10f shown in FIG. 25 as an example. FIG. 27 is a partially enlarged view of the second retrieval frame f2 in which the object 10f exists. Determination points P1, P2, P3 are included in the enlarged part. As described above, the determination distance is the distance between a part of the one object 10 in the second retrieval frame f2 that corresponds to a determination point set on the second retrieval frame f2 and another object 10 or the housing container 11 in the predetermined approach direction set in relation to the determination point. Hence, the determination distance for the determination point P1 shown in FIG. 27 is d1, which is the distance between the object 10f and the side wall of the housing container 11 in the predetermined approach direction. Further, the determination distance for the determination point P2 shown in FIG. 27 is d2, which is the distance between the object 10f and the side wall of the housing container 11 in the predetermined approach direction. The determination distance for the determination point P3 shown in FIG. 27 is d3, which is the distance between the object 10f and the adjacent object 10i in the predetermined approach direction. The determination distance d1 for the determination point P1, which is set on a vertex of the second retrieval frame f2, is greater than the determination distances d2, d3 for the determination points P2, P3, which are set on respective sides of the second retrieval frame f2. Accordingly, the determination distance d1 exceeds a predetermined threshold. Moreover, the determination distance d2 and the determination distance d3 are equal to or smaller than the predetermined threshold. In the approach determination processing, therefore, it is determined that an approach vector is established in relation to the determination point P1 but approach vectors are not established in relation to the determination points P2 and P3.

FIG. 28 is a view showing some results of the approach determination processing performed by the detection unit 442. FIG. 28 shows results of the approach determination processing performed in relation to the object 10f shown in FIG. 25. Note that similarly to FIG. 18, in FIG. 28, a black circle on an arrow indicating a predetermined approach direction indicates that an approach vector is established. Further, in FIG. 28, a cross on an arrow indicating a predetermined approach direction indicates that an approach vector is not established. Furthermore, a solid-line cross indicates that an approach vector is not established due to the fact that the determination distance between the object 10f in the retrieval frame f2 and the housing container 11 is equal to or smaller than the predetermined threshold. Moreover, a dot-dash-line cross indicates that an approach vector is not established due to the fact that the determination distance between the object 10f in the retrieval frame f2 and another object 10 is equal to or smaller than the predetermined threshold.

As described above, the nine objects 10a to 10i are housed in the housing container 11 in rows so that adjacent objects 10 contact each other, and the objects 10a to 10d and 10f to 10i disposed in positions adjacent to the side walls of the housing container 11 also contact the housing container 11. Hence, the only determination distances that exceed the predetermined threshold are the determination distances relating to the determination points set on the vertices of the second retrieval frame f2. Therefore, on the object 10f, as shown in FIG. 28, approach vectors are established only in relation to the determination points set on the vertices of the second retrieval frame f2. Meanwhile, approach vectors are not established in relation to the determination points set on the sides of the second retrieval frame f2.

By determining whether or not the finger portions 21 of the hand mechanism 2 can be caused to approach the parts corresponding to the respective determination points on the one object 10 existing within the second retrieval frame f2 in relation to each of the plurality of determination points set on the second retrieval frame f2, as in the first to third specific examples described above, it is possible to detect the parts of the one object 10 that can be approached by the finger portions 21 of the hand mechanism 2.

(Flow of Image Information Processing)

Next, a flow of the image information processing performed in the image information processing device 44 will be described on the basis of a flowchart shown in FIG. 29. The flow of the image information processing is realized by executing a predetermined processing program in the image information processing device 44. In this flow, first, in S101, image information is acquired from the imaging device 8 by the image information acquisition unit 440.

Next, in S102, the retrieval unit 441 retrieves the housing container 11 and the object 10 from the image captured by the imaging device 8. Here, as described above, the housing container 11 and the object 10 are retrieved on the basis of the shape information of the housing container 11 and the shape information of the object 10, which are stored in the storage unit 443. Further, when the image captured by the imaging device 8 includes a plurality of objects 10, the retrieval unit 441 recognizes the plurality of objects 10 individually.

Next, in S103, the detection unit 442 executes the approach determination processing described above on each of the objects 10 retrieved by the retrieval unit 441. As a result, an approach determination processing result is derived for each object 10, as shown in FIGS. 18, 22, and 28. The approachable parts of each object 10 can thus be detected.

(Hand Control)

Next, a flow of the hand control performed by the hand control device 43 when the object 10 is gripped by the hand mechanism 2 will be described on the basis of a flowchart shown in FIG. 30. The flow of the hand control is realized by executing a predetermined processing program in the hand control device 43.

In this flow, first, in S201, object information, which is information relating to the object 10, is acquired from the image information processing device 44. The object information acquired at this time includes not only the shape information of the object 10 but also the detection results indicating the approachable parts of the respective objects 10 housed in the housing container 11 (in other words, the results of the approach determination processing derived for each of the objects 10 in the image information processing described above), which are acquired by the detection unit 442 of the image information processing device 44.

Next, in S202, the gripping style to be used by the hand mechanism 2 to grip one object 10 housed in the housing container 11 is determined on the basis of the object information acquired from the image information processing device 44. Further, in S203, the parts of the one object 10 housed in the housing container 11 with which the finger portions 21 of the hand mechanism 2 are to be brought into contact when the one object 10 is gripped by the hand mechanism 2 are determined on the basis of the object information acquired from the image information processing device 44.

For example, when the detection results indicating the approachable parts, acquired by the detection unit 442 of the image information processing device 44, are the results illustrated in the first specific example of the image information processing, described above, it can be determined that the finger portions 21 of the hand mechanism 2 can be caused to approach the respective upper faces of the objects 10*b*, 10*c* included in the image shown in FIG. 15. It can also be determined that by tilting the object 10*b* or the object 10*c* forward with the finger portions 21 of the hand mechanism 2 in contact with the upper face of the object 10*b* or the object 10*c*, tilt gripping can be performed thereon. In this case, therefore, tilt gripping is determined during the hand control as the gripping style to be used to grip the object 10*b* or the object 10*c* using the hand mechanism 2. Furthermore, the upper face of the object 10*b* or the object 10*c* is determined as the part of the object 10*b* or the object 10*c* to be contacted by the finger portions 21 of the hand mechanism 2 when tilt gripping is performed thereon.

Further, when the detection results indicating the approachable parts, acquired by the detection unit 442 of the image information processing device 44, are the results illustrated in the second specific example of the image information processing, described above, for example, it can be determined that the finger portions 21 of the hand mechanism 2 can be caused to approach the respective rear side faces of the objects 10*b*, 10*c* included in the image shown in FIG. 20. It can also be determined that by pressing the object 10*b* or the object 10*c* against another object 10 (i.e., the object 10*e* or the object 10*f*) placed in front thereof with the finger portions 21 of the hand mechanism 2 in contact with the rear side face of the object 10*b* or the object 10*c*, and while pressing the object 10*b* or the object 10*c*, shifting the position thereof upward, shift gripping can be performed thereon. In this case, therefore, shift gripping is determined during the hand control as the gripping style to be used to grip the object 10*b* or the object 10*c* using the hand mechanism 2. Furthermore, the rear side face of the object 10*b* or the object 10*c* is determined as the part of the object 10*b* or the object 10*c* to be contacted by the finger portions 21 of the hand mechanism 2 when shift gripping is performed thereon.

Furthermore, when the detection results indicating the approachable parts, acquired by the detection unit 442 of the image information processing device 44, are the results illustrated in the third specific example of the image information processing, described above, for example, it can be determined that the finger portions 21 of the hand mechanism 2 can be caused to approach mutually opposing parts on the side faces of the object 10*f* included in the image shown in FIG. 24. Accordingly, it can be determined that direct gripping can be performed on the object 10*f*. In this case, therefore, direct gripping is determined during the hand control as the gripping style to be used to grip the object 10*f* using the hand mechanism 2. Furthermore, mutually opposing parts on the side faces of the object 10*f* are determined as the parts of the object 10*f* to be contacted by the finger portions 21 of the hand mechanism 2 when direct gripping is performed thereon.

Thus, by acquiring the detection results indicating the approachable parts, which are acquired by the detection unit 442 of the image information processing device 44, during the hand control, it is possible to determine the gripping style and the part of the one object 10 housed in the housing container 11 to be contacted by the finger portions 21 of the hand mechanism 2 when the one object 10 is gripped by the hand mechanism 2.

MODIFIED EXAMPLE

Next, a modified example of the hand control performed by the hand control device according to this embodiment will be described on the basis of FIGS. 31 to 33. FIG. 31 is a view showing the housing container 11 and two objects 10*a*, 10*b* housed in the housing container 11 according to this modified example. In this modified example, the housing container 11 takes the shape of a box in which only the upper part is open. Further, the objects 10*a*, 10*b* have a rectangular parallelepiped shape. Note that FIG. 31 shows a case in which the housing container 11 and the two objects 10*a*, 10*b* housed in the housing container 11 are seen from above.

Further, FIG. 32 shows the form of the hand mechanism 2 when the finger portions 21 of the hand mechanism 2 are caused to approach the object 10*a* shown in FIG. 31 in order to grip the object 10*a*. Hereafter, the form of the hand mechanism 2 shown in FIG. 32 may be referred to as a "first approach form". Furthermore, FIG. 33 shows the form of the hand mechanism 2 when the finger portions 21 of the hand mechanism 2 are caused to approach the object 10*b* shown in FIG. 31 in order to grip the object 10*b*. Hereafter, the form of the hand mechanism 2 shown in FIG. 33 may be referred to as a "second approach form". Note that in FIGS. 32 and 33, for convenience, only the first finger portion 21A and the third finger portion 21C are shown, while the second finger portion 21B and the fourth finger portion 21D are omitted.

Furthermore, the distance between a tip end portion of the third finger portion 31C (the tip end portion of the first finger link portion 211C) and an outside portion of the first joint portion 22C thereof when the hand mechanism 2 is set in the first approach form, shown in FIG. 32, or the second approach form, shown in FIG. 33, may be referred to hereafter as the "finger width". Note that in FIG. 32, the finger width in the first approach form is indicated by df1. Further, in FIG. 33, the finger width in the first approach form is indicated by df2.

In this modified example, as shown in FIG. 31, the two objects 10*a*, 10*b* are both placed in the housing container 11 such that the left-side side faces S2 and right-side side faces S3 thereof are separated from the side walls of the housing container 11. Therefore, in the image information processing performed in the image information processing device 44, the left-side side faces S2 and right-side side faces S3 of the objects 10*a*, 10*b* are detected as approachable parts. As a result, in the hand control performed by the hand control device 43, direct gripping is determined as the gripping style to be used by the hand mechanism 2 to grip the objects 10*a*, 10*b*. Furthermore, when direct gripping is performed on the objects 10*a*, 10*b*, the left-side side faces S2 and right-side side faces S3 thereof are determined as the parts thereof to be contacted by the finger portions 21 of the hand mechanism 2.

Here, as shown in FIG. 31, the object 10*a* is placed in a substantially central part of the housing container 11 in a lateral direction of the housing container 11. More specifically, a distance dL1 from the left-side side face S2 of the object 10*a* to the side wall of the housing container 11 is substantially equal to a distance dR1 from the right-side side face S3 of the object 10*a* to the side wall of the housing container 11. Hence, a sufficient distance from the side wall of the housing container 11 is secured in relation to both the left-side side face S2 and the right-side side face S3 of the object 10a. Therefore, the hand control device 43 determines the first approach form shown in FIG. 32 as the form to be taken by the hand mechanism 2 when the finger portions 21 of the hand mechanism 2 are caused to approach the object 10a. When the object 10a is gripped in the first approach form, as shown in FIG. 32, the first finger portion 21A, which is brought into contact with the left-side side face S2 of the object 10a, and the third finger portion 21C, which is brought into contact with the right-side side face S3 of the object 10a, are opened into a substantially left-right symmetrical shape.

Note that when the first finger portion 21A and the third finger portion 21C of the hand mechanism 2 are caused to approach the object 10a (or the object 10b) so that the object 10a (or the object 10b) is sandwiched between and gripped by the first finger portion 21A and the third finger portion 21C of the hand mechanism 2, an interval W2 between the respective tip end portions of the first finger portion 21A and the third finger portion 21C (the tip end portion of the first finger link portion 211A of the first finger portion 21A and the tip end portion of the first finger link portion 211C of the third finger portion 21C) is set to be much wider than a width W1 between the left-side side face S2 and the right-side side face S3 of the object 10a (or the object 10b).

The object 10b, meanwhile, as shown in FIG. 31, is placed in the housing container 11 in a position close to the right-side side wall of the housing container 11. Accordingly, a distance dL2 from the left-side side face S2 of the object 10b to the side wall of the housing container 11 is considerably greater than the distance dL1 from the left-side side face S2 of the object 10a to the side wall of the housing container 11. Moreover, a distance dR2 from the right-side side face S3 of the object 10b to the side wall of the housing container 11 is considerably smaller than the distance dR1 from the right-side side face S3 of the object 10a to the side wall of the housing container 11.

Hence, the distance dR2 from the right-side side face S3 of the object 10b to the side wall of the housing container 11 is smaller than the finger width df1 in the first approach form, shown in FIG. 32. Therefore, when the form of the hand mechanism 2 is set in the first approach form shown in FIG. 32, the finger portions 21 of the hand mechanism 2 cannot be caused to approach the object 10b.

Accordingly, the hand control device 43 determines the second approach form shown in FIG. 33 as the form to be taken by the hand mechanism 2 when the finger portions 21 of the hand mechanism 2 are caused to approach the object 10b. When the object 10b is gripped in the second approach form, as shown in FIG. 33, the first finger portion 21A, which is brought into contact with the left-side side face S2 of the object 10b, and the third finger portion 21C, which is brought into contact with the right-side side face S3 of the object 10b, are opened into a left-right non-symmetrical shape. Further, in the second approach form, the finger width df2 is smaller than the distance dR2 from the right-side side face S3 of the object 10b to the side wall of the housing container 11. Note, however, that likewise in the second approach form, the interval W2 between the respective tip end portions of the first finger portion 21A and the third finger portion 21C is kept equal to the interval W2 in the first approach form shown in FIG. 32. By setting the form of the hand mechanism 2 in the second approach form in this manner, the finger portions 21 of the hand mechanism 2 can be caused to approach the object 10b.

In this modified example, as described above, the hand control device 43 determines the form of the hand mechanism 2 to be taken when the finger portions 21 of the hand mechanism 2 are caused to approach the object 10 on the basis of the distance between the part of the gripping target object 10 to be contacted by the finger portions 21 of the hand mechanism 2 and the housing container 11 (or another object 10). As a result, the finger portions 21 of the hand mechanism 2 can be caused to approach the object 10 in a form corresponding to the placement condition of the gripping target object 10 within the housing container 11.

Note that the form of the hand mechanism 2 when the finger portions 21 of the hand mechanism 2 are caused to approach is not limited to the first approach form shown in FIG. 32 and the second approach form shown in FIG. 33, and any forms that can be taken by the hand mechanism 2 may be used.

REFERENCE SIGNS LIST

1 Robot arm
2 Hand mechanism
8 Imaging device
20 Base portion
21 Finger portion
22 First joint portion
23 Second joint portion
211 First finger link portion
212 Second finger link portion
213 Base end portion
3 Arm mechanism
30a First joint portion
30b Second joint portion
30c Third joint portion
30d Fourth joint portion
30e Fifth joint portion
30f Sixth joint portion
31 First arm link portion
32 Second arm link portion
33 Third arm link portion
34 Fourth arm link portion
35 Fifth arm link portion
36 Connecting member
4 Support portion
42 Arm control device
420 Arm control unit
421 Motor state quantity acquisition unit
43 Hand control device
430 Object information acquisition unit
431 Hand control unit
432 Motor state quantity acquisition unit
44 Image information processing device
440 Image information acquisition unit
441 Retrieval unit
442 Detection unit
443 Storage unit
70 Pressure sensor
100 Gripping system

The invention claimed is:

1. An image information processing device, which is applied to a gripping system for gripping an object housed in a housing container by using a hand mechanism having a plurality of finger portions, the gripping system including an imaging device for capturing an image including the housing container and at least one object housed in the housing container, and which processes image information acquired by the imaging device, the image information processing device comprising:

a retrieval unit which, on the basis of shape information about the housing container and shape information about the object, with the shape information being stored in advance, retrieves the housing container and the object from the image captured by the imaging device, the housing container being retrieved using a first retrieval frame, which is a retrieval frame for retrieving the housing container, and the object being retrieved using a second retrieval frame, which is a retrieval frame for retrieving the object; and a detection unit that detects a part of one object, housed in the housing container, that can be approached by the finger portions of the hand mechanism on the basis of contact states of the one object relative to other objects and the housing container, the contact states being acquired from retrieval results acquired by the retrieval unit, wherein a plurality of determination points are set in advance in predetermined positions on the second retrieval frame, and a predetermined approach direction is set for each of the determination points, and the detection unit determines whether or not the finger portions of the hand mechanism can be caused to approach parts of the one object, existing within the second retrieval frame, that correspond respectively to the determination points set on the second retrieval frame from the predetermined approach directions set in relation to the determination points.

2. The image information processing device according to claim 1, wherein, when another object or the housing container is in contact with a part of the one object, existing within the second retrieval frame, that corresponds to a determination point set on the second retrieval frame from the predetermined approach direction set in relation to the determination point, the detection unit determines that the finger portions of the hand mechanism cannot be caused to approach the part of the one object corresponding to the determination point from the predetermined approach direction.

3. The image information processing device according to claim 1, wherein, when a distance between a part of the one object, existing within the second retrieval frame, that corresponds to a determination point set on the second retrieval frame and another object or the housing container in the predetermined approach direction set in relation to the determination point is equal to or shorter than a predetermined threshold, the detection unit determines that the finger portions of the hand mechanism cannot be caused to approach the part of the one object that corresponds to the determination point from the predetermined approach direction.

4. The image information processing device according to claim 1, wherein the second retrieval frame is a polygonal frame set in accordance with the size of an outer periphery of the object on the image, and the determination points are set on each side and each vertex of the second retrieval frame.

5. The image information processing device according to claim 4, wherein, when the shape of the outer periphery of the object on the image is rectangular, two directions that are respectively orthogonal to two sides forming a vertex of the second retrieval frame are set as the predetermined approach directions in relation to the determination point set on each of the vertices of the second retrieval frame, which correspond to the vertices of the outer periphery of the object.

6. The image information processing device according to claim 5, wherein, when the one object existing within the second retrieval frame is in contact with the housing container, the detection unit determines that the finger portions of the hand mechanism cannot be caused to approach the vertex, on the outer periphery of the one object on the image, that is formed by the side contacting the housing container and another side from either of the two predetermined approach directions set in relation to the determination point set on the vertex of the second retrieval frame that corresponds to the relevant vertex.

7. The image information processing device according to claim 4, wherein, when the shape of the outer periphery of the object on the image is circular, diagonal line directions extending from the respective vertices of the second retrieval frame are set as the predetermined approach directions in relation to the determination points set on the respective vertices.

8. A gripping system comprising:
the hand mechanism;
the imaging device; and
the image information processing device according to claim 1, and moreover
a hand control device that determines, on the basis of detection results acquired by the detection unit of the image information processing device, a gripping style to be used by the hand mechanism to grip the one object housed in the housing container.

9. A gripping system comprising:
the hand mechanism;
the imaging device; and
the image information processing device according to claim 1, and moreover
a hand control device that determines, on the basis of detection results acquired by the detection unit of the image information processing device, a part of the one object, housed in the housing container, to be contacted by the finger portions of the hand mechanism when the one object is gripped by the hand mechanism.

10. The gripping system according to claim 8, wherein the hand control device determines a form to be taken by the hand mechanism when the finger portions of the hand mechanism are caused to approach the one object on the basis of a distance between the part of the one object to be contacted by the finger portions of the hand mechanism and another object or the housing container.

11. An image information processing method, which is employed in a gripping system for gripping an object housed in a housing container by using a hand mechanism having a plurality of finger portions to process image information acquired by an imaging device that captures an image including the housing container and at least one object housed in the housing container, the image information processing method comprising:

a retrieval step for retrieving, on the basis of shape information about the housing container and shape information about the object, with the shape information being stored in advance, the housing container and the object from the image captured by the imaging device, the housing container being retrieved using a first retrieval frame, which is a retrieval frame for retrieving the housing container, and the object being retrieved using a second retrieval frame, which is a retrieval frame for retrieving the object; and a detection step for detecting a part of one object, housed in the housing container, that can be approached by the finger portions of the hand mechanism on the basis of contact states of the one object relative to other objects and the housing container, the contact states being acquired from retrieval results acquired in the retrieval step, wherein a plurality of determination points are set in advance in predetermined positions on the second retrieval frame, and a predetermined approach direction is set for each of the determination points, and in the detection step, a determination is made as to whether or not the finger portions of the hand mechanism can be caused to approach parts of the one object, existing within the second retrieval frame, that correspond respectively to the determination points set on the second retrieval frame from the predetermined approach directions set in relation to the respective determination points.

12. The image information processing method according to claim 11, wherein, in the detection step, when another object or the housing container is in contact with a part of the one object, existing within the second retrieval frame, that corresponds to a determination point set on the second retrieval frame from the predetermined approach direction set in relation to the determination point, causing the finger portions of the hand mechanism to approach the part of the one object that corresponds to the determination point from the predetermined approach direction is determined to be impossible.

13. The image information processing method according to claim 11, wherein, in the detection step, when a distance between a part of the one object, existing within the second retrieval frame, that corresponds to a determination point set on the second retrieval frame and another object or the housing container in the predetermined approach direction set in relation to the determination point is equal to or shorter than a predetermined threshold, causing the finger portions of the hand mechanism to approach the part of the one object that corresponds to the determination point from the predetermined approach direction is determined to be impossible.

* * * * *